United States Patent
Kim et al.

(10) Patent No.: US 10,652,873 B2
(45) Date of Patent: May 12, 2020

(54) METHOD AND APPARATUS FOR EFFECTIVELY PROVIDING TDD CONFIGURATION INFORMATION TO USER EQUIPMENT AND DETERMINING UPLINK TRANSMISSION TIMING IN MOBILE COMMUNICATION SYSTEM SUPPORTING TDD

(71) Applicant: Samsung Electronics Co., Ltd., Suwon-si, Gyeonggi-do (KR)

(72) Inventors: Sangbum Kim, Suwon-si (KR); Soenghun Kim, Suwon-si (KR); Kyeongin Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 41 days.

(21) Appl. No.: 15/954,261

(22) Filed: Apr. 16, 2018

(65) Prior Publication Data
US 2018/0234958 A1     Aug. 16, 2018

Related U.S. Application Data

(63) Continuation of application No. 15/451,395, filed on Mar. 6, 2017, now Pat. No. 9,949,254, which is a (Continued)

(30) Foreign Application Priority Data

Jan. 21, 2013     (KR) ........................ 10-2013-0006533

(51) Int. Cl.
*H04J 3/00*      (2006.01)
*H04W 72/04*     (2009.01)
(Continued)

(52) U.S. Cl.
CPC ........ *H04W 72/042* (2013.01); *H04B 7/2656* (2013.01); *H04L 5/14* (2013.01);
(Continued)

(58) Field of Classification Search
None
See application file for complete search history.

(56) References Cited

U.S. PATENT DOCUMENTS

2012/0320806 A1   12/2012   Ji et al.
2013/0279377 A1   10/2013   Zhao et al.
(Continued)

FOREIGN PATENT DOCUMENTS

CN       102075949 A      5/2011
EP       2658303 A1      10/2013
(Continued)

OTHER PUBLICATIONS

Korean Intellectual Property Office, "Office Action," Application No. KR10-2013-0006533, dated Nov. 1, 2018, 7 pages.
(Continued)

*Primary Examiner* — Clemence S Han

(57) ABSTRACT

A method for configuring a time division duplex (TDD) of a user equipment in a communication system, according to one embodiment of the present invention, comprises the steps of: receiving from a base station a first TDD configuration; receiving from the base station a message including information related to a dynamic TDD configuration; receiving a second TDD configuration according to the received information related to the dynamic TDD configuration; receiving from the base station an uplink grant; and determining whether to apply the first TDD configuration or the second TDD configuration based on a method by which the unlink grant is received. According to one embodiment of the present invention, the advantages of configuring a
(Continued)

shorter cycle of the TDD to the user equipment supporting the TDD in a wireless communication system, and rapidly configuring the TDD to the user equipment variably according to a communication situation are provided.

16 Claims, 23 Drawing Sheets

Related U.S. Application Data continuation of application No. 14/762,398, filed as application No. PCT/KR2014/000594 on Jan. 21, 2014, now Pat. No. 9,591,665.

(51) Int. Cl.
*H04B 7/26* (2006.01)
*H04L 7/00* (2006.01)
*H04L 7/033* (2006.01)
*H04L 5/14* (2006.01)
*H04W 72/12* (2009.01)
*H04W 72/14* (2009.01)
*H04W 74/08* (2009.01)
*H04L 5/00* (2006.01)

(52) U.S. Cl.
CPC ........ *H04L 5/1438* (2013.01); *H04L 5/1469* (2013.01); *H04L 7/0037* (2013.01); *H04L 7/0041* (2013.01); *H04L 7/0337* (2013.01); *H04W 72/0446* (2013.01); *H04W 72/12* (2013.01); *H04W 72/1268* (2013.01); *H04W 72/14* (2013.01); *H04W 74/0808* (2013.01); *H04L 5/001* (2013.01); *H04L 5/0078* (2013.01); *H04L 5/0092* (2013.01)

(56) References Cited

U.S. PATENT DOCUMENTS

2014/0086224 A1 3/2014 Kwon et al.
2017/0331611 A1* 11/2017 Stern-Berkowitz ..........................
H04W 72/1289

FOREIGN PATENT DOCUMENTS

| | | |
|---|---|---|
| EP | 2947791 A1 | 11/2015 |
| JP | 2012-525781 A | 10/2012 |
| KR | 10-2012-0139102 A | 12/2012 |
| KR | 10-2012-0140189 A | 12/2012 |
| WO | 2012083811 A1 | 6/2012 |

OTHER PUBLICATIONS

European Patent Office, "European Search Report," Application No. EP18200771.6, dated Nov. 13, 2018, 7 pages.
Anite, "GCF Priority 3—Correction to EUTRA MAC testcase 7.1.4.2," R5-121450, 3GPP TSG RAN WG5 Meeting #55, Prague, Czech Republic, May 21-25, 2012, 9 pages. XP050622274.
Catt, "DL Assignment during non-contention based Rach for DL data arrival," R2-093763, 3GPP TSG-WG2 Meeting #66bis, Los Angeles, USA, Jun. 29-Jul. 3, 2009, 3 pages. XP050351991.
Office Action in connection with Korean Application No. 10-2019-0130076 dated Feb. 19, 2020, 10 pages.

* cited by examiner

FIG. 17

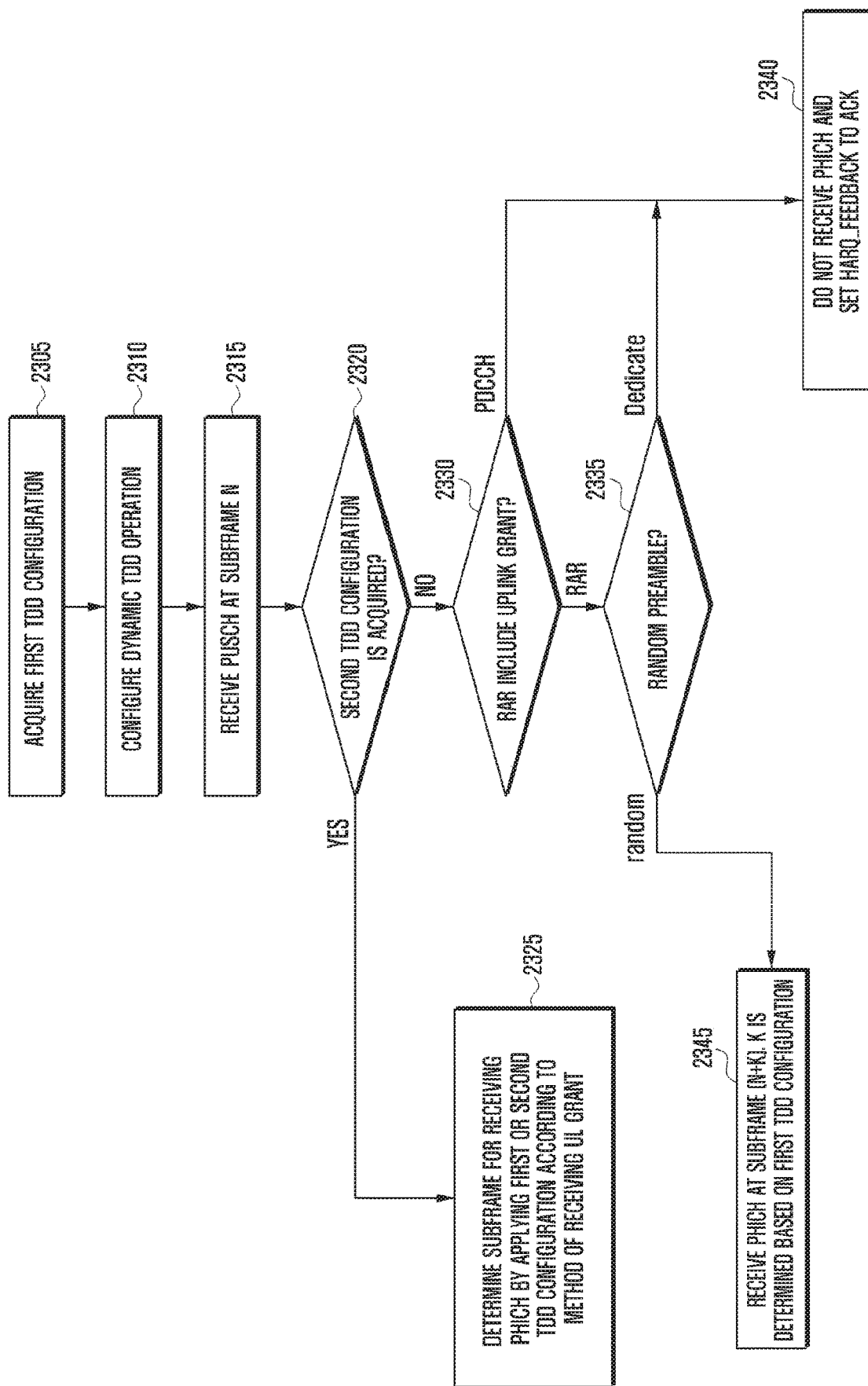

METHOD AND APPARATUS FOR EFFECTIVELY PROVIDING TDD CONFIGURATION INFORMATION TO USER EQUIPMENT AND DETERMINING UPLINK TRANSMISSION TIMING IN MOBILE COMMUNICATION SYSTEM SUPPORTING TDD

CROSS-REFERENCE TO RELATED APPLICATIONS AND CLAIM OF PRIORITY

This application is a continuation of application Ser. No. 15/451,395, filed Mar. 6, 2017, which a continuation of application Ser. No. 14/762,398, which is the National Stage of International Application No. PCT/KR2014/000594, filed Jan. 21, 2014, now U.S. Pat. No. 9,591,665, which claims foreign priority to Korean Patent Application No. 10-2013-0006533, filed Jan. 21, 2013, the disclosures of which are herein incorporated by reference in their entirety.

BACKGROUND

1. Field

The present invention relates to a method and apparatus for providing a User Equipment with TDD configuration information effectively and determining uplink transmission timing in a mobile communication system supporting TDD.

2. Description of Related Art

Mobile communication systems were developed to provide mobile users with communication services. With the rapid advance of technologies, the mobile communication systems have evolved to the level capable of providing high speed data communication service beyond the early voice-oriented services.

Recently, standardization for a Long Term Evolution (LTE) system as one of the next-generation mobile communication systems, is underway in the $3^{rd}$ Generation Partnership Project (3GPP). LTE is a technology designed to provide high speed packet-based communication of up to 100 Mbps and aims at commercial deployment around 2010 timeframe. In order to accomplish the aim, a discussion is being held on several schemes, e.g. reducing the number of nodes located in a communication path by simplifying a configuration of the network and maximally approximating wireless protocols to wireless channels.

Meanwhile, unlike voice service, the data service is provided on the resource determined according to the data amount to be transmitted and channel condition. Accordingly, the wireless communication system, especially cellular communication, is provided with a scheduler which manages transmission resource allocation in consideration of the required resource amount, channel condition, data amount, etc. This is the fact in the LTE system as the next generation mobile communication system, and the schedule located at the base station manages the transmission resource allocation.

Recent studies are focused on the LTE-Advanced (LTE-A) for improving data rate with the adoption of various new techniques to legacy LTE system. Interference Mitigation and Traffic Adaptation (IMTA) is one of the techniques being studied for use in the LTE-A system. The IMTA is a technique of changing the ratio between uplink and downlink resource allocation amounts at a short cycle for controlling the uplink and downlink traffics and interference amounts in TDD mode. In order to implement the IMTA technique efficiently, it is necessary to improve the LTE-A system in various respects.

SUMMARY

The present invention has been proposed to solve the above problem and aims to provide a base station and a user equipment configuring TDD mode of the terminal variably and operation methods of the user equipment and base station in a wireless communication system supporting Time Division Duplex (TDD)

In order to achieve the above objects, a Time Division Duplex (TDD) configuration method of a terminal in a communication system according to an embodiment of the present invention includes receiving a first TDD configuration from a base station, receiving a message including a dynamic TDD configuration information from the base station, receiving a second TDD configuration according to the received dynamic TDD configuration information, receiving an uplink grant from the base station, and determining to apply one of the first and second TDD configurations based on a method in which the uplink grant is received.

A terminal of configuring Time Division Duplex (TDD) in a communication system according to another embodiment of the present invention includes a transceiver which receives a first TDD configuration from a base station, receives a message including a dynamic TDD configuration information from the base station, receives a second TDD configuration according to the received dynamic TDD configuration information, and receives an uplink grant from the base station and a controller which determines to apply one of the first and second TDD configurations based on a method in which the uplink grant is received.

A Time Division Duplex (TDD) configuration method of a base station in a communication system according to another embodiment of the present invention includes transmitting a first TDD configuration to a terminal, receiving a message including TDD configuration capability from the terminal, determining whether to configure dynamic TDD operation based on the received message, transmitting a message including dynamic TDD configuration information to the terminal according to the determination result, transmitting a second TDD configuration according to the dynamic TDD configuration information, and transmitting an uplink grant according to one of the first and second TDD configuration.

A base station of configuring Time Division Duplex (TDD) of a terminal in a communication system according to still another embodiment of the present invention includes a transceiver which transmits a first TDD configuration to the terminal and receives a message including TDD configuration capability from the terminal and a controller which determines whether to configure dynamic TDD operation based on the received message, wherein the transceiver transmits a second TDD configuration according to the dynamic TDD configuration information and transmits an uplink grant according to one of the first and second TDD configurations, and the terminal applies one of the first and second TDD configurations based on a method in which the uplink grant is received.

The method and apparatus according to an embodiment of the present invention is advantageous in terms of allowing for configuring a relatively short TDD cycle to the user equipment and configuring TDD to the user equipment dynamically in adaptation to the communication condition

BRIEF DESCRIPTION OF DRAWINGS

FIG. 17 is a diagram exemplifying a UE operation of determining a subframe for uplink transmission by applying the first and second TDD configurations selectively;

FIG. 23 is a flowchart illustrating a UE operation of selecting a subframe for receiving PHICH at the UE which has not acquired the second TDD configuration temporarily.

DETAILED DESCRIPTION

Figure 1:
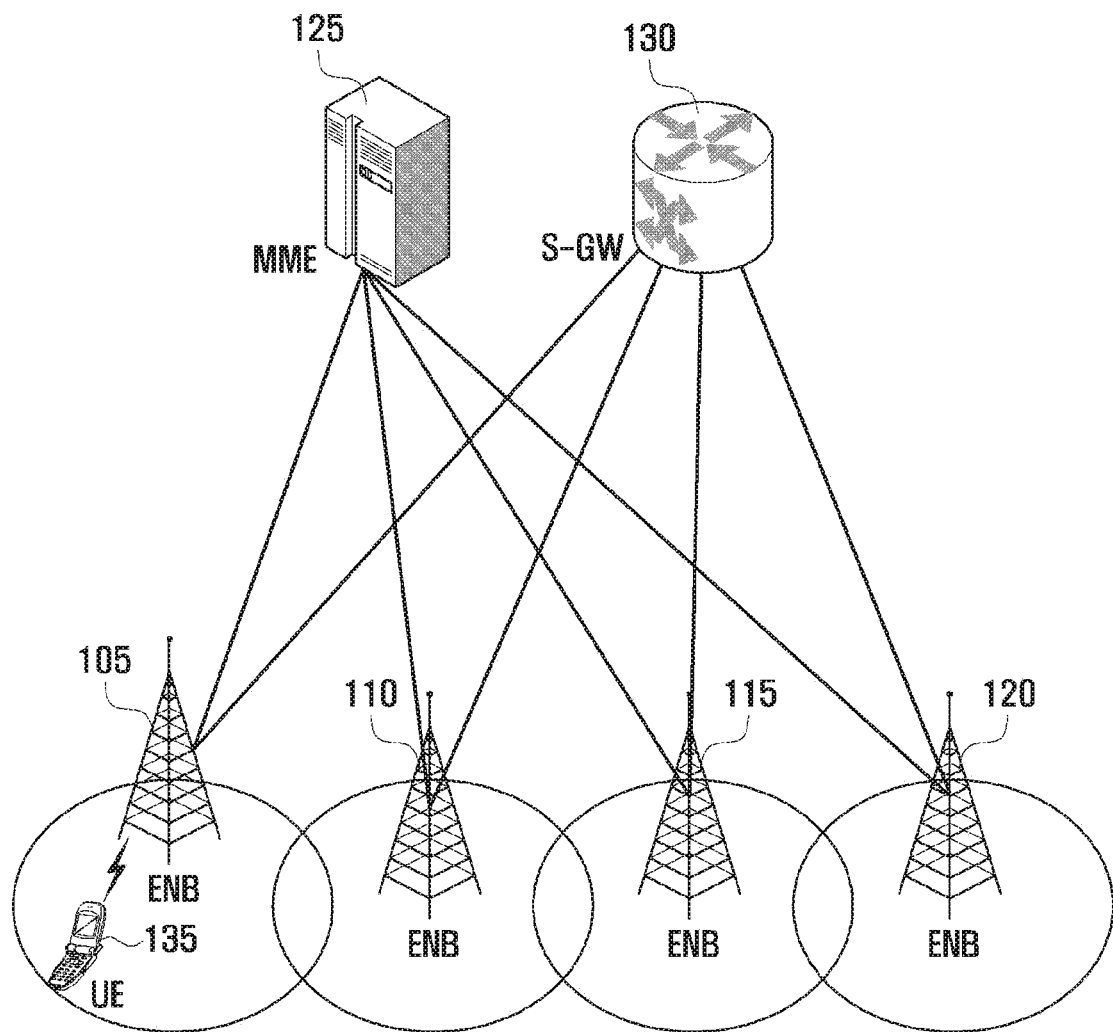
FIG. 1 is a diagram illustrating the architecture of an LTE system to which the present invention is applied.

Exemplary embodiments of the present invention are described with reference to the accompanying drawings in detail.

Detailed description of ell-known functions and structures incorporated herein may be omitted to avoid obscuring the subject matter of the present invention. This aims to omit unnecessary description so as to make the subject matter of the present invention clear.

For the same reason, some of elements are exaggerated, omitted or simplified in the drawings and the elements may have sizes and/or shapes different from those shown in drawings, in practice. The same reference numbers are used throughout the drawings to refer to the same or like parts.

An embodiment of the present invention relates to a method and apparatus for providing a user equipment with TDD configuration information and determining uplink transmission timing in a mobile communication system supporting TDD, The first and second embodiments are directed to methods of transmitting the TDD configuration changing at a short cycle to a user equipment efficiently, and the third embodiment is directed to a method of determining an uplink transmission timing in such situation.

In order to change the ratio between uplink and downlink resource allocation amounts at a short cycle, it is necessary to change the TDD configuration information promptly. For this purpose, it is necessary to transmit the TDD configuration information to the user equipment quickly. The present invention proposes a method for transmitting the frequently changing TDD configuration information to the user equipment effectively. Prior to the explanation of the present invention, a description is made of the UE system. TDD configuration information, and TDD frame structure to which the present invention is applied.

FIG. 1 is a diagram illustrating the architecture of an LTE system to which the present invention is applied.

As shown FIG. 1, the radio access network of the LTE system includes evolved Node Bs (eNBs) 105, 110, 115, and 120, a Mobility Management Entity (MME) 125, and a Serving-Gateway (S-GW) 130. The User Equipment (hereinafter, referred to as UE) 135 connects to an external network via the eNBs 105, 110, 115, and 120 and the S-GW 130.

In FIG. 1, the Bs 105, 110, 115, and 120 correspond to the legacy node Bs of the UMTS system. The eNBs 105, 110, 115, and 120 allow the UE 135 to establish a radio channel and are responsible for functions more complicated as compared to the legacy node B. In the LTE system, all the user traffic services including real time services such as Voice over Internet Protocol (VoIP) are provided through a shared channel and thus there is a need of a device to schedule data based on the state information (such as buffer status, power headroom status, and channel condition of the UE), the eNBs 105, 110, 115, and 120 being responsible for such functions. Typically, one eNB controls a plurality of cells. In order to secure the data rate of up to 100 Mbps, the LTE system adopts Orthogonal Frequency Division Multiplexing (OFDM) as a radio access technology. Also, the LTE system adopts Adaptive Modulation and Coding (AMC) to determine the modulation scheme and channel coding rate in adaptation to the channel condition of the UE. The S-GW 130 is an entity to provide data bearers so as to establish and release data bearers under the control of the MME 125. The MME 125 is responsible for mobility management of UEs and various control functions and may be connected to a plurality of eNBs.

Figure 2:
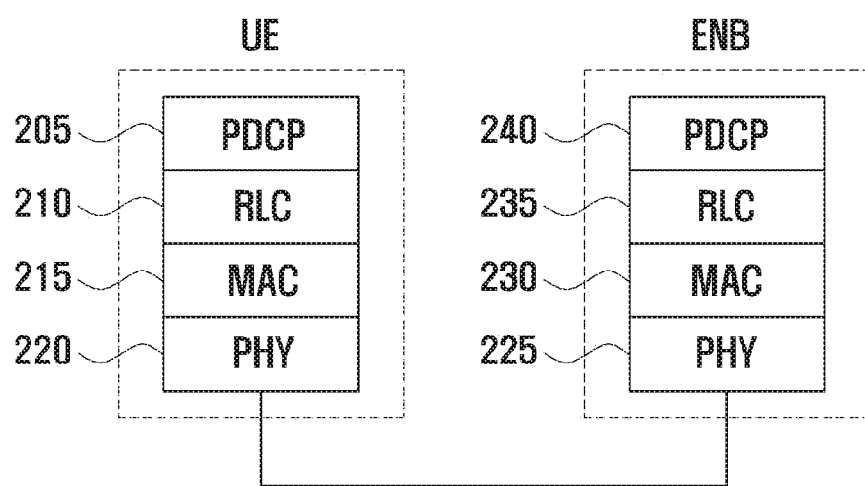
FIG. 2 is a diagram illustrating a protocol stack of the LTE system to which the present invention is applied.

FIG. 2 is a diagram illustrating a protocol stack of the LTE system which the present invention is applied.

Referring to FIG. 2, the protocol stack of the UE system includes Packet Data Convergence Protocol(PDCP) 205 and 240, Radio Link Control (RLC) 210 and 235, Medium Access Control (MAC) 215 and 230, and Physical (PHY) 220 and 225. The PDCP 205 and 240 is responsible for IP header compression/decompression, and the RLC 210 and 235 is responsible for segmenting the PDCP Protocol Data Unit (PDU) into segments in appropriate size. The MAC 215 and 230 is responsible for establishing connection to a plurality of RLC entities so as to multiplex the RLC PDUs into MAC PDUs and demultiplex the MAC PDUs into RLC PDUs. The PHY 220 and 225 performs channel coding on the MAC PDU and modulates the MAC PDU into OFDM symbols to transmit over radio channel or performs demodulating and channel-decoding on the received OFDM symbols and delivers the decoded data to the higher layer. Also, the PHY layer uses Hybrid ARQ (HARQ) for additional error correction by transmitting 1 bit information indicating for positive or negative acknowledgement from the receiver to the transmitter. This is referred to as HARQ ACK/NACK information. The downlink HARQ ACK/NACK corresponding to the uplink transmission is carried by Physical Hybrid-ARQ Indicator Channel TIMM, and the uplink HARQ ACK/NACK corresponding to downlink transmission is carried by Physical Uplink Control Channel (PUCCH) or Physical Uplink Shared Channel (PUSCH).

The LTE standard supports two types of duplex modes including Frequency Division Duplex (FDD) and Time Division Duplex (TDD). FDD operates on two frequency bands for separate uplink and downlink, and TDD operates with one frequency band for uplink and downlink. Accordingly, the transmission alternates between uplink and downlink subframes in TDD. The UE has to know of the uplink and downlink subframes accurately, and the eNB provides the UE with the subframe information in advance. The information on the uplink and downlink subframes is in the form of a TDD configuration, and the eNB notifies the UE of one of 7 TDD configurations as shown in table 1. According to the TDD configuration, each subframe is categorized into one of uplink subframe, downlink subframe, and special subframe. In table 1, D represents downlink subframe for downlink data transmission, and U represents uplink subframe for uplink data transmission. The special subframe is the subframe between consecutive downlink and uplink subframes. The reason for interposing the special subframe is that the timing of receiving the downlink subframe completely and the timing of transmitting uplink data vary depending on the location of the UE. For example, the UE located far from the eNB receives data transmitted by the eNB with a time lag. In contrast, in order for the eNB to receive data transmitted by the UE in a predetermined time, the UE has to start transmitting earlier. Meanwhile, there is no need of the special subframe between consecutive uplink and downlink subframes. Table 1 shows uplink-downlink configurations.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Figure 14:
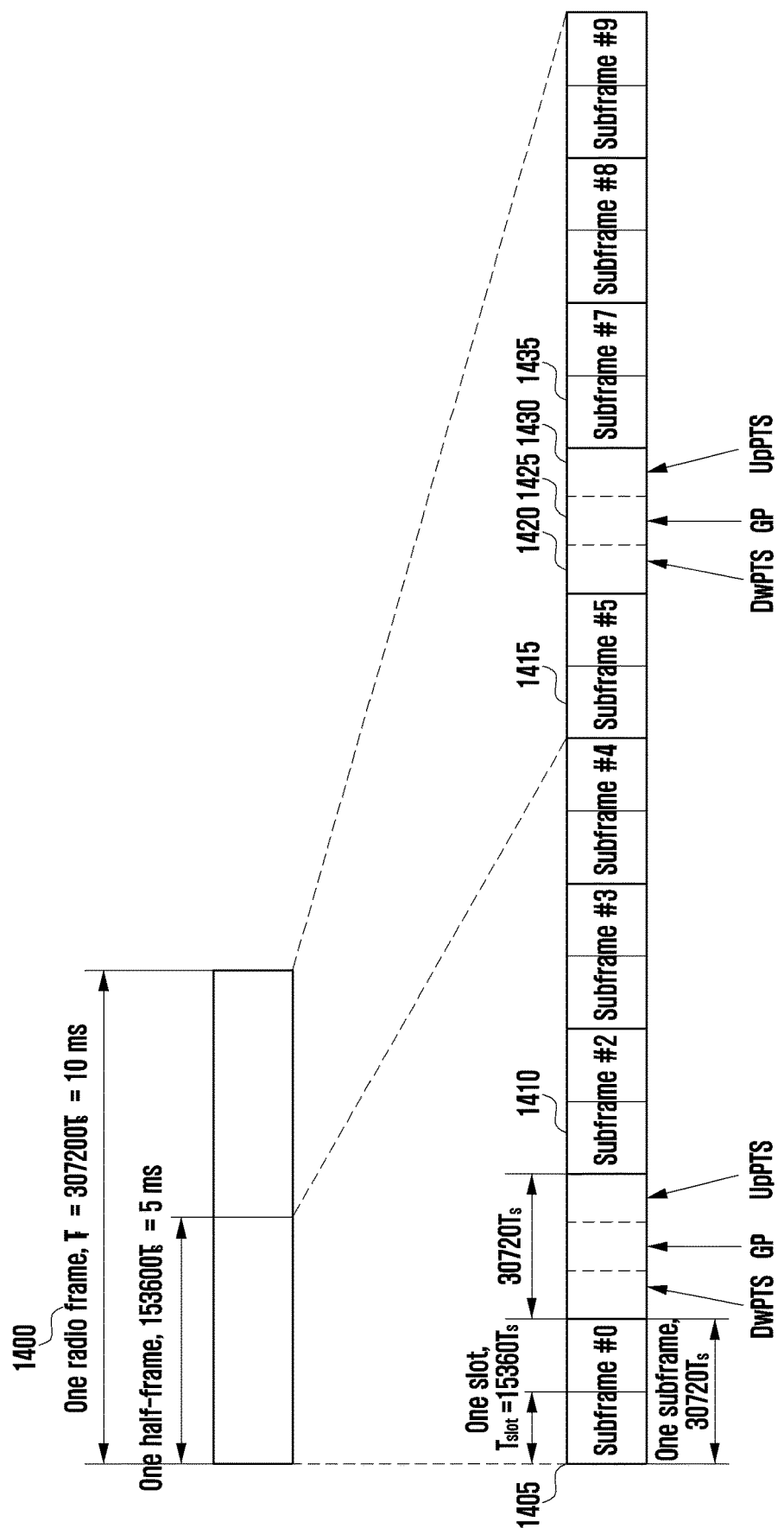
FIG. 14 is a diagram for explaining a TDD frame structure.

FIG. 14 is a diagram for explaining a TDD frame structure. The radio frame 1400 spans 10 ms and consists of 10 subframes. Each subframe spans 1 ms and consists of two slots. In FIG. 14, the subframes 1405 and 1415 are downlink subframes, and the subframes 1410 and 1435 are uplink subframes, i.e. one of TDD configurations 0, 1, 2, and 6 is used. Accordingly, the subframe between two consecutive downlink and uplink subframes is the special subframe. The special subframe comprises three regions represented by Downlink Pilot TimeSlot (DwPTS) 1420, Guard Period (GP) 1425, and Uplink Pilot TimeSlot (UpPTS) 1430. There is not data transmission in GP. The optimal DwPTS and UpPTS value may be determined depending on the radio environment. Accordingly, the eNB has to notify the UE of appropriate DwPTS and UpPTS values as exemplified in table 2. The TDD configuration in table 1 and DwPTS and UpPTS values in table 2 are delivered to the UE in UE Tdd-Config of SystemInformationBlockType1 (SIB1) broadcast by the eNB. Table 2 shows special subframe configurations (lengths of DwPTS/GP/UpPTS).

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Table 3 shows the frequency bands concept of the LTE standard. An LTE carrier belongs to a frequency band, and the parameters to be applied to UE transmit power calculation are determined differently depending on the frequency band. In a carrier aggregation technique, the carriers belonging to the same or different bands may be aggregated. In order to support the carrier aggregation technique, a UE may be implemented with a plurality of Radio Frequency (RE) modules. if the carriers to be used by the UE belong to the neighboring frequency bands, the same RF module can be used and, otherwise if the carriers belong to the bands far from each other in frequency, different RE modules are used. This is because the performance characteristic of the RE module varies according to the frequency applied thereto. If the carriers to be used by the UE belong to the bands adjacent to each other in frequency and thus the same RF module is used, the same TDD configuration has to be used. This is because it is impossible to split the carriers belonging to an RF module to apply the different TDD configurations. In contrast, if the carriers to be used by the UE belong to the bands far from each other in frequency and thus a plurality of RF modules have to be used, different TDD configurations may be applied to the respective carriers. Accordingly, it is necessary for the UE to notify the eNB of the IMTA technology supportability per frequency band. Table 3 shows E-UTRA operating bands.

Embodiment 1

In embodiment 1, the eNB transmits dynamic TDD configuration information with SIB1 as one of common broadcast informations. Prior to the explanation thereof, a brief description is made of a normal SIB transmission method.

Figure 3:
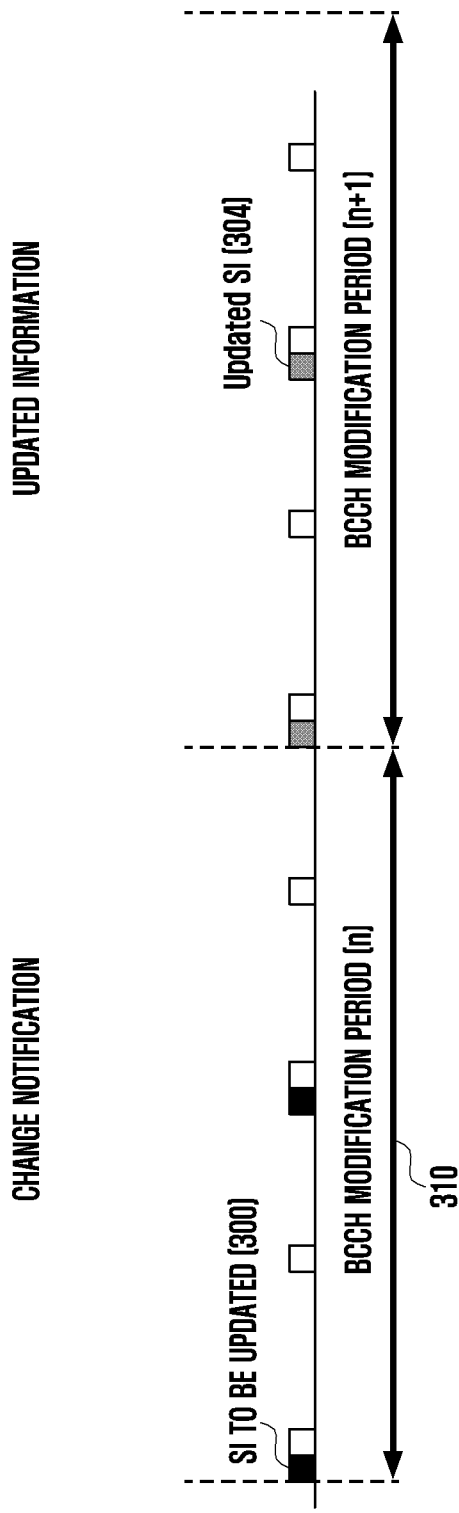
FIG. 3 is a diagram for explaining a modification period in a normal SIB transmission method.

FIG. 3 is a diagram for explaining a modification period in a normal SIB transmission method.

Referring to FIG. 3, the normal SIB transmission method adopts the concept of modification period 310. That is, it is noted that the SI 300 is updated through a paging message during the modification period before the SI update. If a systemInfoModification IE exists in the paging message, this means that the updated SI 304 begins to be transmitted since the next modification period. Even when only one of several SI messages is updated, this is indicated in the paging message. In the exceptional cases of SIB10 and SIB11 carrying ETWS, they are updated regardless of the boundary of modification case. If the paging message indicates ETWS along with an etws-Indication IE, the UE attempts receiving SIB10 and SIB11 immediately. The length of the modification period is indicated by the SIB2 and has a maximum value of 10.24 seconds.

Figure 4:
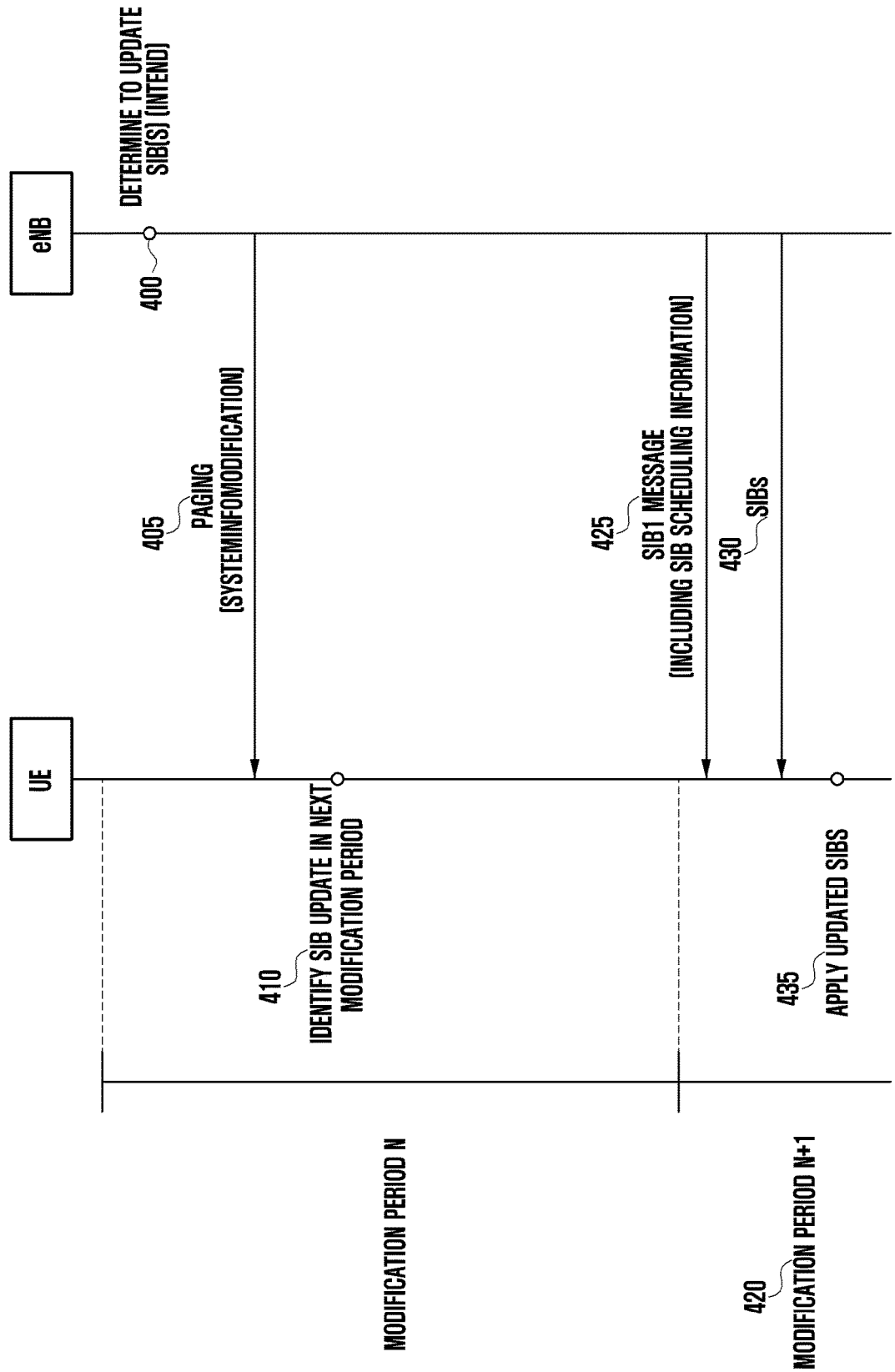
FIG. 4 is a signal flow diagram illustrating a normal SIB transmission method.

FIG. 4 is a signal flow diagram illustrating a normal SIB transmission method.

Referring to FIG. 4, the eNB determines to update the SIB info tion at step 400. The eNB sends the UE the paging

TABLE 3

| E-UTRA Operating Band | Uplink (UL) operating band BS receive UE transmit $F_{UL\ low}$-$F_{UL\ high}$ | | Downlink (DL) operating band BS transmit UE receive $F_{DL\ low}$-$F_{DL\ high}$ | | Duplex Mode |
|---|---|---|---|---|---|
| 1 | 1920 MHz | 1980 MHz | 2110 MHz | 2170 MHz | FDD |
| 2 | 1850 MHz | 1910 MHz | 1930 MHz | 1990 MHz | FDD |
| 3 | 1710 MHz | 1785 MHz | 1805 MHz | 1880 MHz | FDD |
| 4 | 1710 MHz | 1755 MHz | 2110 MHz | 2155 MHz | FDD |
| 5 | 824 MHz | 849 MHz | 869 MHz | 894 MHz | FDD |
| 6 | 830 MHz | 840 MHz | 875 MHz | 885 MHz | FDD |
| 7 | 2500 MHz | 2570 MHz | 2620 MHz | 2690 MHz | FDD |
| 8 | 880 MHz | 915 MHz | 925 MHz | 960 MHz | FDD |
| 9 | 1749.9 MHz | 1784.9 MHz | 1844.9 MHz | 1879.9 MHz | FDD |
| 10 | 1710 MHz | 1770 MHz | 2110 MHz | 2170 MHz | FDD |
| 11 | 1427.9 MHz | 1447.9 MHz | 1475.9 MHz | 1495.9 MHz | FDD |
| 12 | 699 MHz | 716 MHz | 729 MHz | 746 MHz | FDD |
| 13 | 777 MHz | 787 MHz | 746 MHz | 756 MHz | FDD |
| 14 | 788 MHz | 798 MHz | 758 MHz | 768 MHz | FDD |
| 15 | Reserved | | Reserved | | FDD |
| 16 | Reserved | | Reserved | | FDD |
| 17 | 704 MHz | 716 MHz | 734 MHz | 746 MHz | FDD |
| 18 | 815 MHz | 830 MHz | 860 MHz | 875 MHz | FDD |
| 19 | 830 MHz | 845 MHz | 875 MHz | 890 MHz | FDD |
| 20 | 832 MHz | 862 MHz | 791 MHz | 821 MHz | FDD |
| 21 | 1447.9 MHz | 1462.9 MHz | 1495.9 MHz | 1510.9 MHz | FDD |
| 22 | 3410 MHz | 3490 MHz | 3510 MHz | 3590 MHz | FDD |
| 23 | 2000 MHz | 2020 MHz | 2180 MHz | 2200 MHz | FDD |
| 24 | 1626.5 MHz | 1660.5 MHz | 1525 MHz | 1559 MHz | FDD |
| 25 | 1850 MHz | 1915 MHz | 1930 MHz | 1995 MHz | FDD |
| 26 | 814 MHz | 849 MHz | 859 MHz | 894 MHz | FDD |
| . . . | | | | | |
| 33 | 1900 MHz | 1920 MHz | 1900 MHz | 1920 MHz | TDD |
| 34 | 2010 MHz | 2025 MHz | 2010 MHz | 2025 MHz | TDD |
| 35 | 1850 MHz | 1910 MHz | 1850 MHz | 1910 MHz | TDD |
| 36 | 1930 MHz | 1990 MHz | 1930 MHz | 1990 MHz | TDD |
| 37 | 1910 MHz | 1930 MHz | 1910 MHz | 1930 MHz | TDD |
| 38 | 2570 MHz | 2620 MHz | 2570 MHz | 2620 MHz | TDD |
| 39 | 1880 MHz | 1920 MHz | 1880 MHz | 1920 MHz | TDD |
| 40 | 2300 MHz | 2400 MHz | 2300 MHz | 2400 MHz | TDD |
| 41 | 2496 MHz | 2690 MHz | 2496 MHz | 2690 MHz | TDD |
| 42 | 3400 MHz | 3600 MHz | 3400 MHz | 3600 MHz | TDD |
| 43 | 3600 MHz | 3800 MHz | 3600 MHz | 3800 MHz | TDD |

NOTE 1:
Band 6 is not applicable message including the SystemInfoModification IE at step 405. The paging message indicates that newly updated SIB information begins to be transmitted since the next modification period. The UE receives the paging message and identifies that the SIB information is updated in the next modification period at step 410. If the next modification period 420 arrives, the UE attempts decoding SIB1 first at step 425. This is because the SIB1 has the scheduling information for other SIBs. The UE receives the newly updated SIB information at step 430. The UEs applies the modified SIB information at step 435.

Figure 5:
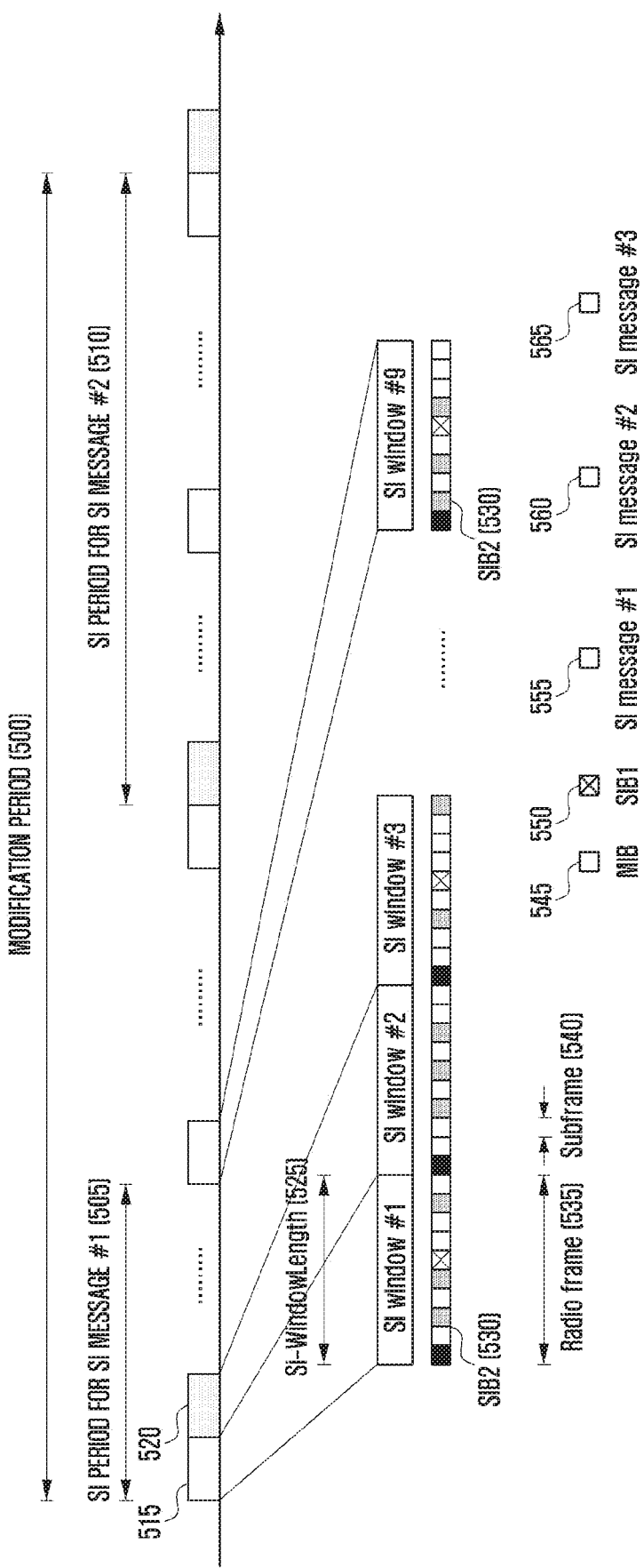
FIG. 5 is a diagram for explaining a normal SIB scheduling method.

FIG. 5 is a diagram for explaining a normal SIB scheduling method.

Referring to FIG. 5, the common information broadcast by the eNB includes the MIB (MasterInfomationBlock) 545 and SIB1 to SIB13, and SIB14 is being discussed for supporting new technologies. The MIB includes most essential information such as System Frame Number (SFN) and frequency bandwidth. The MIB is transmitted at the first subframe of every radio frame 535. Since the MIB carries the same information during the four consecutive radio frame, its period is 40 ms. The SIB1 550 includes cell access and SIB scheduling information. The SIB2 is transmitted in the fifth subframe of every even-numbered radio frame. The rest SIB2~SIB13 are transmitted in one of a plurality of SI messages 555, 560, and 565. The SI message including the plural SIBs is transmitted during the SI window which is a time duration defined by Si-WindowLength 525, and other SI message may be transmitted overlappingly for the time duration. The Si-WindowLength is notified to the UE by means of the SIB1. and set to a value which applied to all SI messages commonly. The SIB informations included in one SI message are transmitted in one subframe sequentially according to the scheduling information during the SI window. Among the subframes within the SI window, MBSFN subframes. TDD uplink subframes, subframes carrying the SIB1 (the fifth subframes of even-numbered radio frame) are restrictive for SIB transmission. The SIB2 530 is fixed as the first SIB information of the first SI message. The first SI message 555 is transmitted repeatedly at a predetermined period 505. That is, the first SI message 555 transmitted in the first SI window 515 is retransmitted after the predetermined period 505. The second SI message 560 is transmitted in the second SI window 520 and then retransmitted repeatedlynother period 510. The transmission periods of the respective SI messages are notified to the UE in the SIB1.

In order to notify the UE of the dynamic TDD configuration information which varies at an interval of a few or a few hundred ms, SIB1 is most suitable among the above-described SIBs. The MIB includes only the most essential information and has not many surplus bits. Meanwhile, the SIB1 is longer than MIB and transmitted at a relatively long interval but it is short in comparison to other SIBs. Since the SIB1 is transmitted repeatedly at a designated subframe, no scheduling information is needed. As described above, the other SIB informations can be received with the scheduling information acquired from another SIB. In the case of using SIB1, the problem occurs in the modification period-based SIB transmission procedure. Assuming that the SIB1 includes dynamic TDD configuration, it is necessary to notify that the SIB is to be updated through paging at the previous modification period of the time of transmitting the modified SIB1 in order to send the updated dynamic TDD configuration to the UE. After the modification period elapses, the eNB transmits the modified SIB1. This means that the updated dynamic TDD configuration cannot be notified to the UE at the right time by taking notice of the modification period of the dynamic TDD configuration. The present invention proposes an SIB1 transmission method in which the eNB includes the dynamic TDD configuration information in the SIB1immediately as soon as the dynamic TDD configuration information is updated and the UE receives and decodes the SIB1 continuously other than abiding by the legacy modification period.

Figure 6:
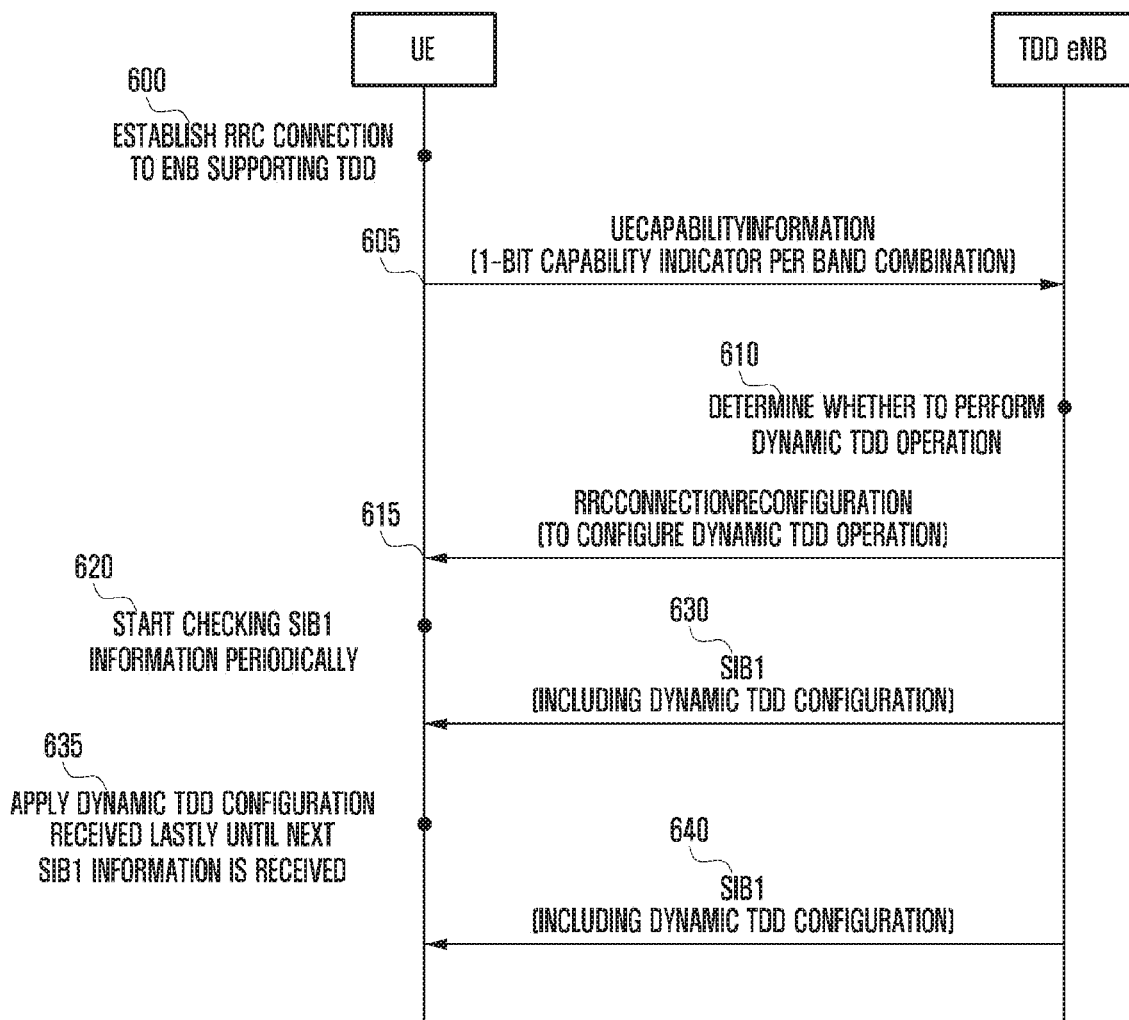
FIG. 6 is a signal flow diagram illustrating the embodiment 1.

FIG. 6 is a signal flow diagram illustrating the embodiment 1.

Referring to FIG. 6, the UE establishes an RRC connection with the eNB supporting TDD at step 600. The UE provides the eNB with the capability bits indicating the per-frequency band dynamic TDD configuration capabilities at step 605. The reason why per-frequency band capability bits are required has been described above. The eNB determines whether to apply the dynamic TDD configuration on the specific carrier belonging to a specific band to the UE at step 610. The eNB sends the UE an RRCConnectionReconfiguration message to trigger the dynamic TDD at step 615. Upon receipt of this message, the UE receives and decodes the SIB1 information transmitted periodically at step 620. The UE acquires the dynamic TDD configuration information from the SIB1 at step 630. The UE performs the dynamic TDD using the dynamic TDD configuration received lastly at step 635 until any updated dynamic TDD configuration information. The UE receives the updated dynamic TDD configuration information at step 640. The UE repeats the above operation until the dynamic TDD operation ends.

Figure 7:
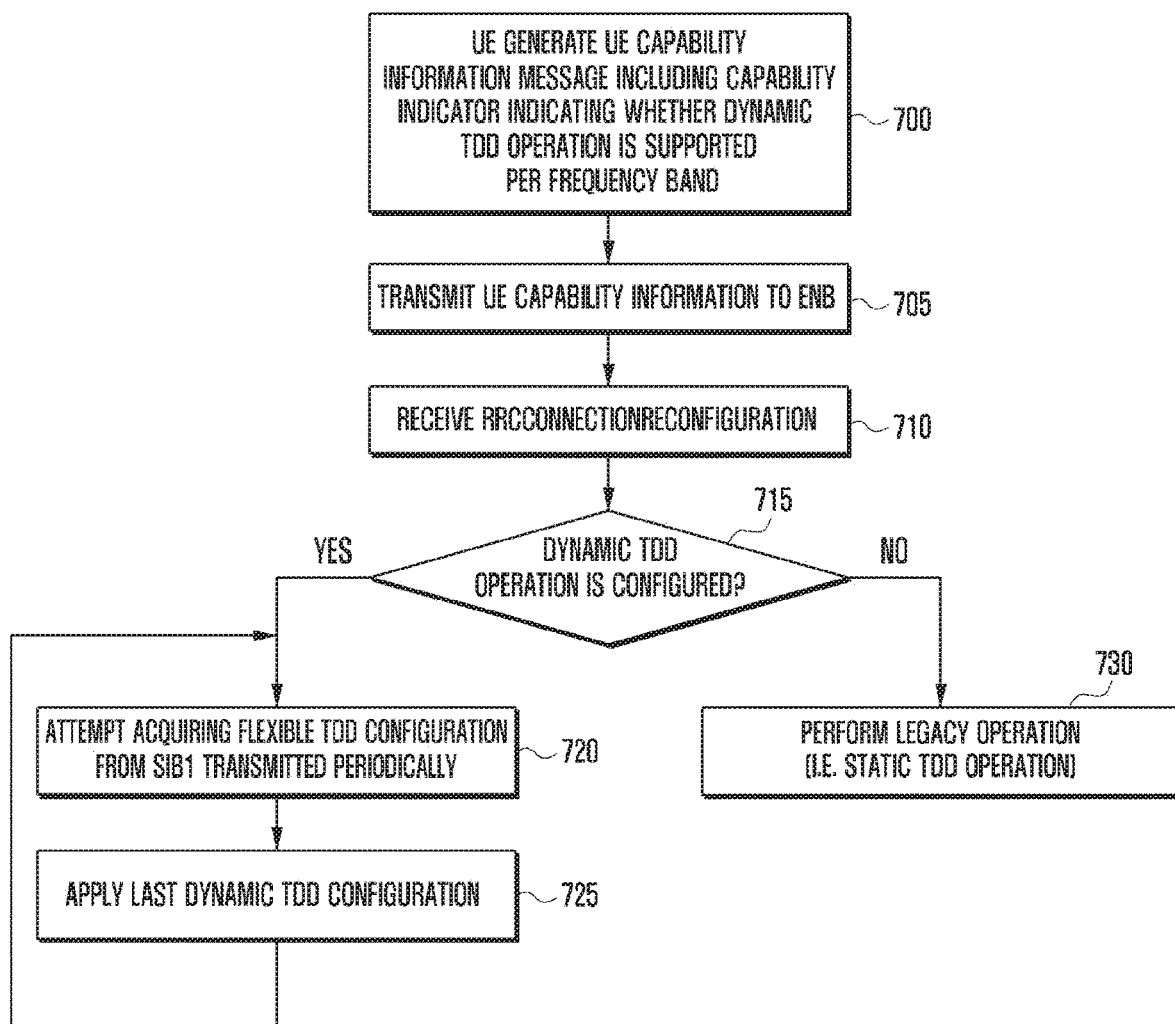
FIG. 7 is a flowchart illustrating the UE operation in the embodiment 1.

FIG. 7 is a flowchart illustrating the UE operation in the embodiment 1.

Referring to FIG. 7, the UE generates a UE capability information message including capability indicators indicating per-frequency band dynamic TDD operation supportabilities at step 700. The UE sends the eNB the UE capability information message at step 705. The UE receives an RRCConnectionReconfiguration message from the eNB at step 710. The UE determines whether to configure dynamic TDD operation based on the message at step 715. If it is determined to configure the dynamic TDD operation, the UE acquires the dynamic TDD configuration information from the SIB1 which is broadcast periodically at step 720. The UE performs the dynamic TDD operation based on the last dynamic TDD configuration information at step 725. If it is determined not to configure the dynamic TDD operation, the UE performs the legacy TDD operation at step 730.

Figure 8:
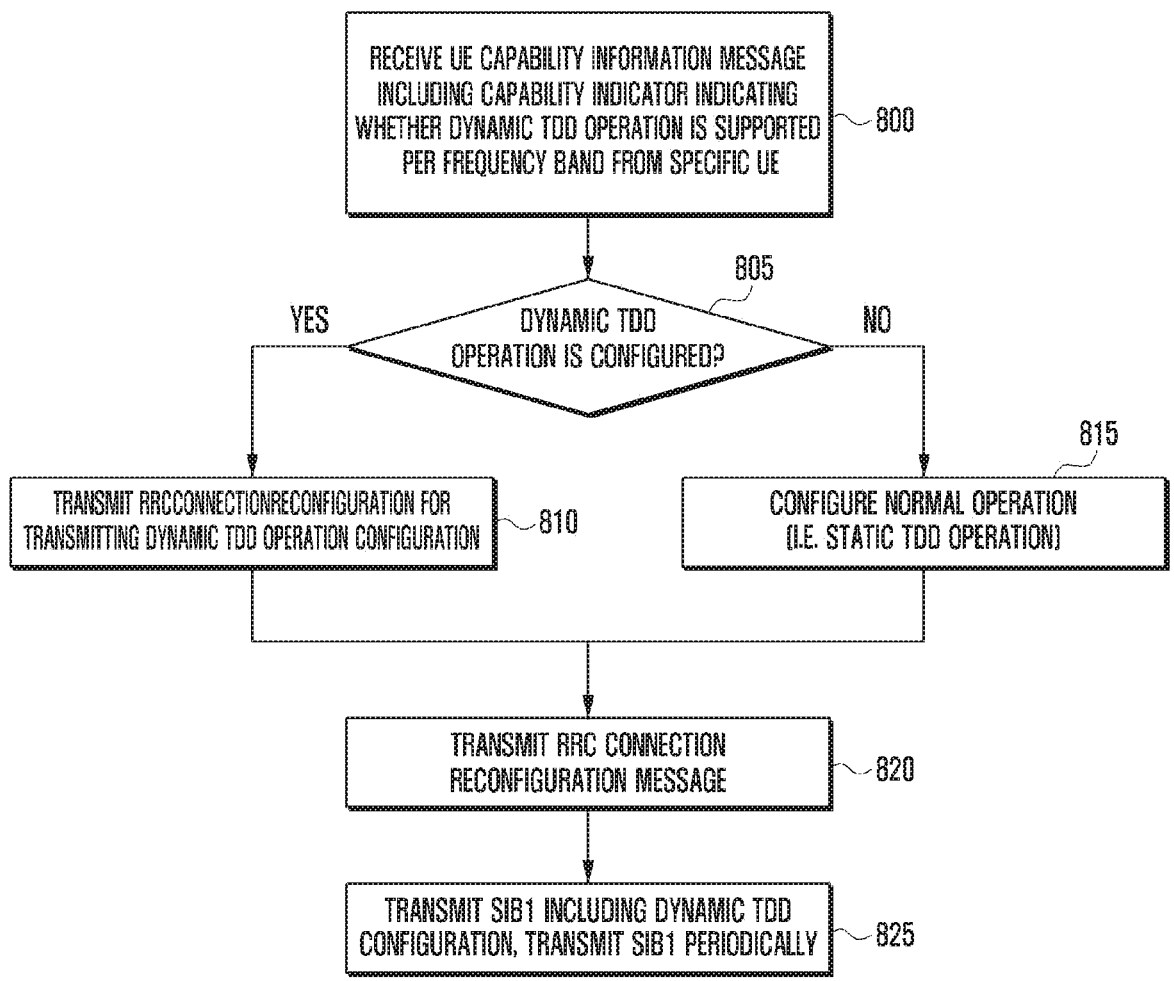
FIG. 8 is a flowchart illustrating the eNB operation in the embodiment 1.

FIG. 8 is a flowchart illustrating the eNB operation in the embodiment

Referring to FIG. 8, the eNB receives a LTE capability information message including capability indicators indicating per-frequency band dynamic TDD operation supportabilities at step 800.

The eNB determines whether to configure dynamic TDD operation based on the message at step 805. If it is determined to configure the dynamic TDD operation, the eNB configures the dynamic TDD operation using the RRCConnectionReconfiguration message at step 810. If it is determined not to configure the dynamic TDD operation, the eNB configures the static TDD operation at step 815. The eNB transmits the RRCConnectionReconfiguration message to the UE at step 820. The eNB broadcasts the SIB1 including the last dynamic TDD configuration at step 825.

Embodiment 2

In embodiment 2 the dynamic TDD configuration information is transmitted in the paging message. Prior to the explanation thereof, a description is made of the normal paging transmission method.

The paging message is transmitted in a subframe of a radio frame predetermined per UE. Since both the eNB and UE know the transmission timing, the UE attempts receiving the paging message only at the transmission timings. The radio frame in which the paging message is transmitted is referred to as Paging Frame (PF), and the subframe carrying the paging message in the PF is referred to as Paging Occasion (PO). The PF and PO are derived by the following two equations.

$$\text{SFN mod } T = (T \text{ div } N) * (\text{UE\_ID mod } N) \quad (1)$$

$$i\_s = \text{floor}(\text{UE\_ID}/N) \text{mod } N_s \quad (2)$$

Here, T denotes the DRX cycle. nB is set to a value of {4T, 2T, T, T/2, T/4, T/8, T/16, T/32}. N is a value of min(T,nB). Ns is a value of max(1,nB/T). The UE_ID is defined as IMSI mode 1024, and. LMSI is the UE ID. i_s is derived using the following table. Table 4 shows the TDD configurations (all UL/DL configurations).

TABLE 4

| Ns | PO when i_s = 0 | PO when i_s = 1 | PO when i_s = 2 | PO when i_s = 3 |
|---|---|---|---|---|
| 1 | 0 | N/A | N/A | N/A |
| 2 | 0 | 5 | N/A | N/A |
| 4 | 0 | 1 | 5 | 6 |

In this embodiment, three bits for indicating the TDD configuration is added to the paging message. Also, in order to reduce the signaling overhead of PDCCH, the paging message for dynamic TDD configuration may be transmitted with the fixed PF and PO. The paging message for the dynamic TDD configuration is not required to be received by all of the UEs but the UEs having the dynamic TDD capability in the connected mode. The eNB sends the UE having the dynamic TDD configuration the PagingCycle-dynamic-TDD and i_s-dynamic-TDD information using a dedicated RRC message. The PagingCycle-dynamic-TDD denotes the period of the radio frame carrying the paging message including the dynamic TDD configuration information (PF period). The i_s-dynamic-TDD denotes the PO. The i_s-dynamic-TDD may be defined as shown in table 4.

Figure 15:
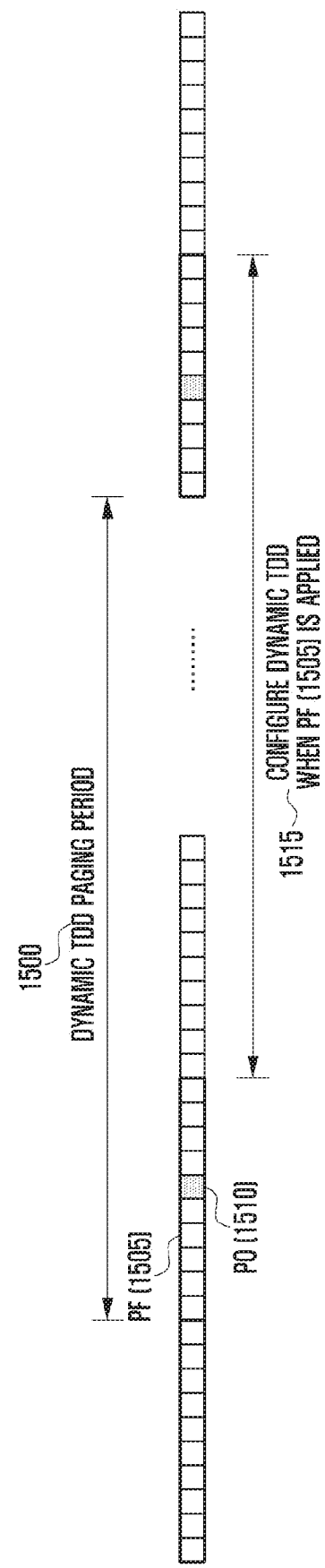
FIG. 15 is a diagram for explaining the PagingCycle-dynamic-TDD and i_s-dynamic-TDD information.

FIG. 15 is a diagram for explaining the pagingCycle-dynamic-TDD and i_s-dynamic-TDD information.

Referring to FIG. 15, the PagingCycle-dynamic-TDD 1500 is the transmission period of the paging message including the dynamic TDD configuration. The PF 1505 denotes the radio frame in which the paging message including the dynamic TDD configuration information is transmitted. The PO 1510 is the subframe carrying the paging message indicated by the i_s-dynamic-TDD. The dynamic TDD configuration information received through the padding message is applied until the next paging message is received as denoted by reference number 1515.

Figure 9:
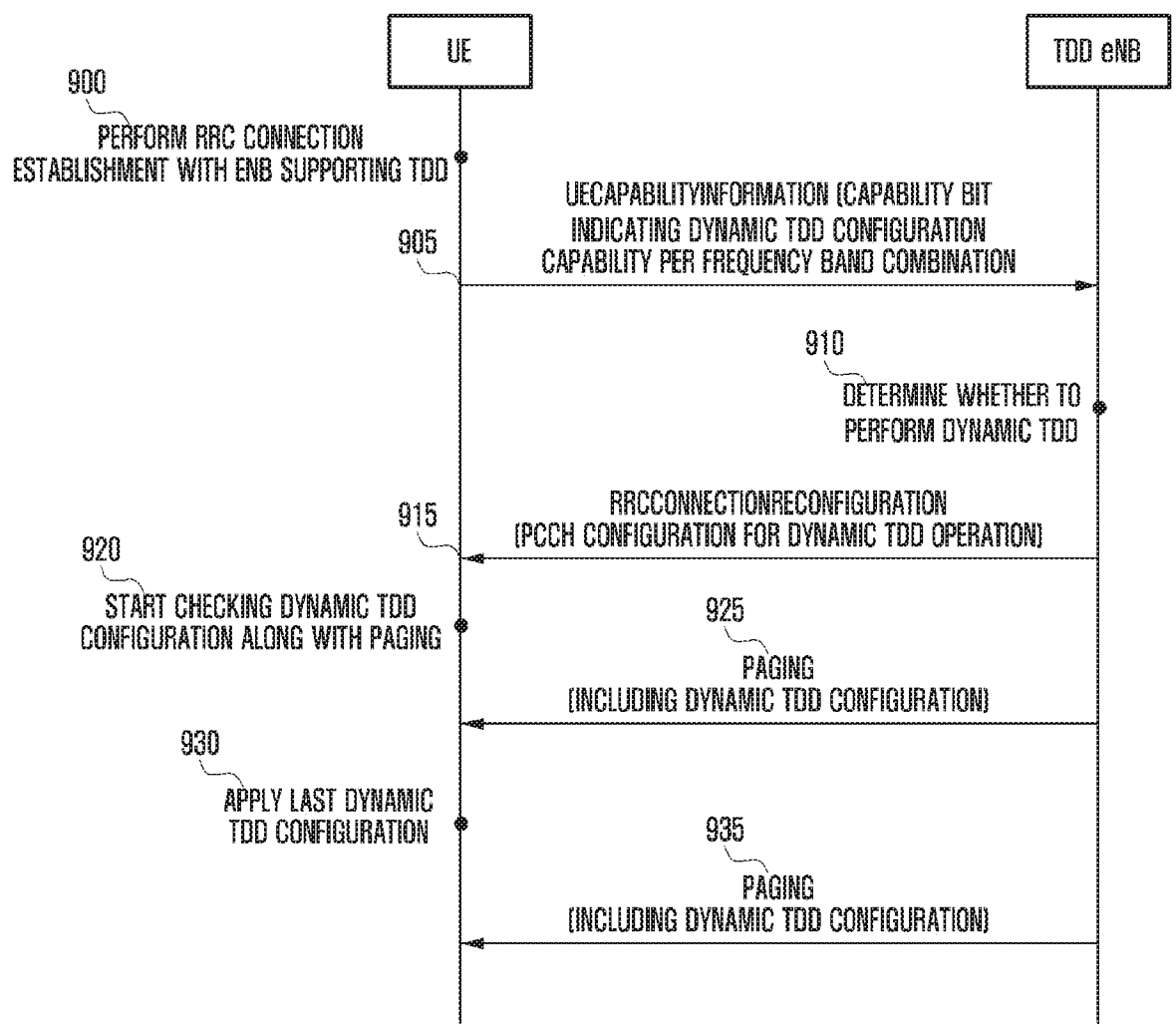
FIG. 9 is a signal flow diagram of embodiment 2.

FIG. 9 is a signal flow diagram of embodiment 2.

Referring to FIG. 9, the UE establishes an RRC connection with the eNB supporting TDD at step 900. The UE sends the eNB the capability bits indicating per-frequency band dynamic TDD configuration supportabilities at step 905. The necessity of the per-frequency band capability bits has been described in detail above. The eNB determines whether to configure the dynamic TDD on a specific carrier belonging to the specific band to the UE at step 910. The eNB sends the UE the RRCConnectionReconfiguration message including the PagingCycle-dynamic-TDD and i_s-dynamic-TDD information at step 915. Upon receipt of this message, the UE receives and decodes the paging information transmitted periodically at step 920. The UE acquires the dynamic TDD configuration information from the paging message at step 925. The UE performs the dynamic TDD by applying the last dynamic TDD configuration until any updated dynamic TDD configuration information is received at step 930. The UE receives the updated dynamic TDD configuration information at step 935. The UE repeats the above operation until the dynamic TDD operation ends.

Figure 10:
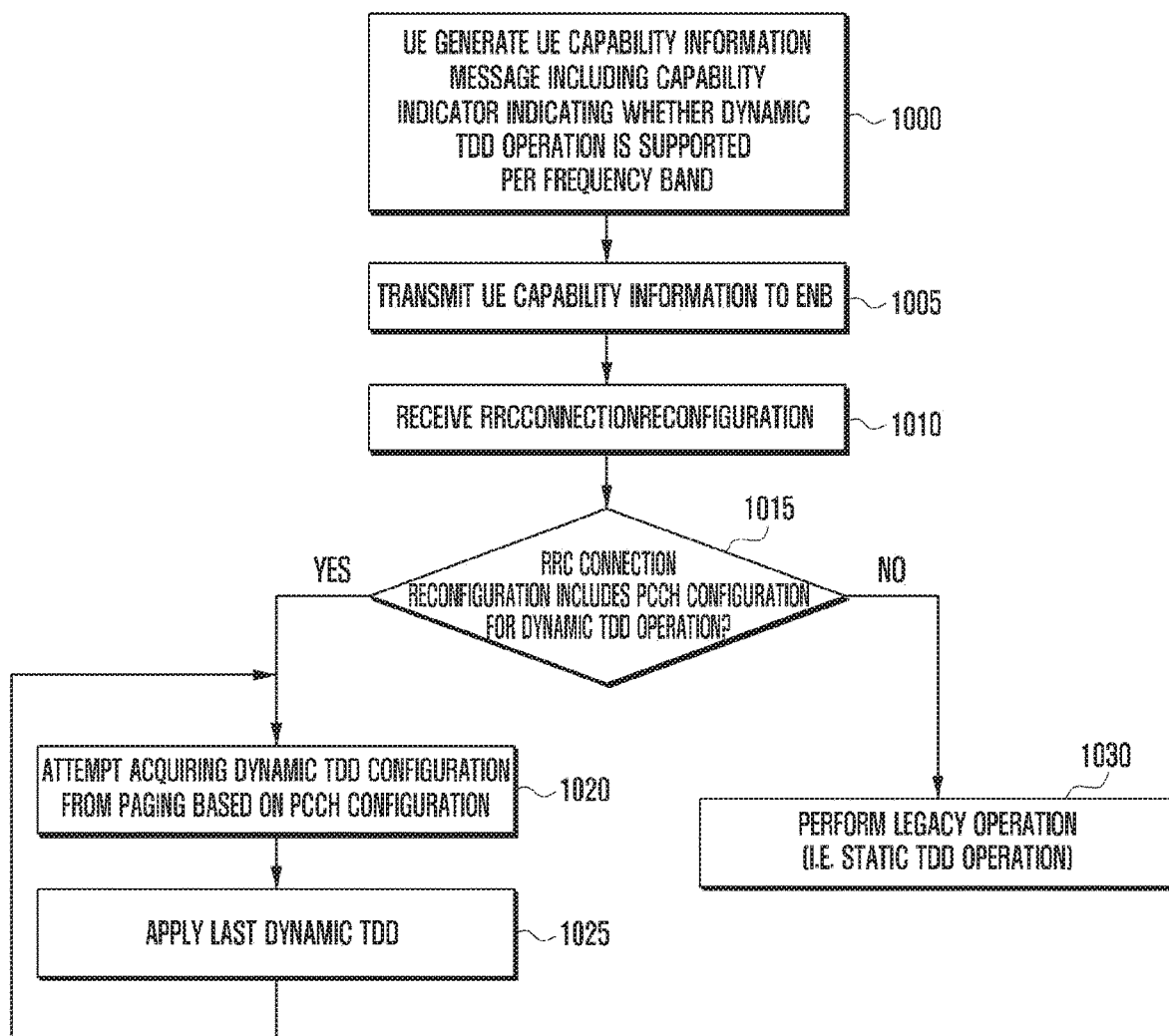
FIG. 10 is a flowchart illustrating the UE operation in the embodiment 2.

FIG. 10 is a flowchart illustrating the UE operation in the embodiment 2.

Referring to FIG. 10, the UE generates a UE capability information message including capability indicators indicating per-frequency band dynamic TDD operation supportabilities at step 1000. The UE sends the eNB the UE capability information message at step 1005. The UE receives the RRCConnectionReconfiguration message from the eNB at step 1010. The UE determines whether the message includes the dynamic TDD operation configuration and PagingCycle-dynamic-TDD and i_s-dynamic-TDD information at step 1015. If the dynamic TDD operation is configured, the UE acquires dynamic TDD configuration information from the paging message transmitted periodically at step 1020. The UE performs the dynamic TDD operation by applying the last dynamic TDD configuration information at step 1025. If the dynamic TDD operation is not configured, the UE performs the legacy TDD operation at step 1030.

Figure 11:
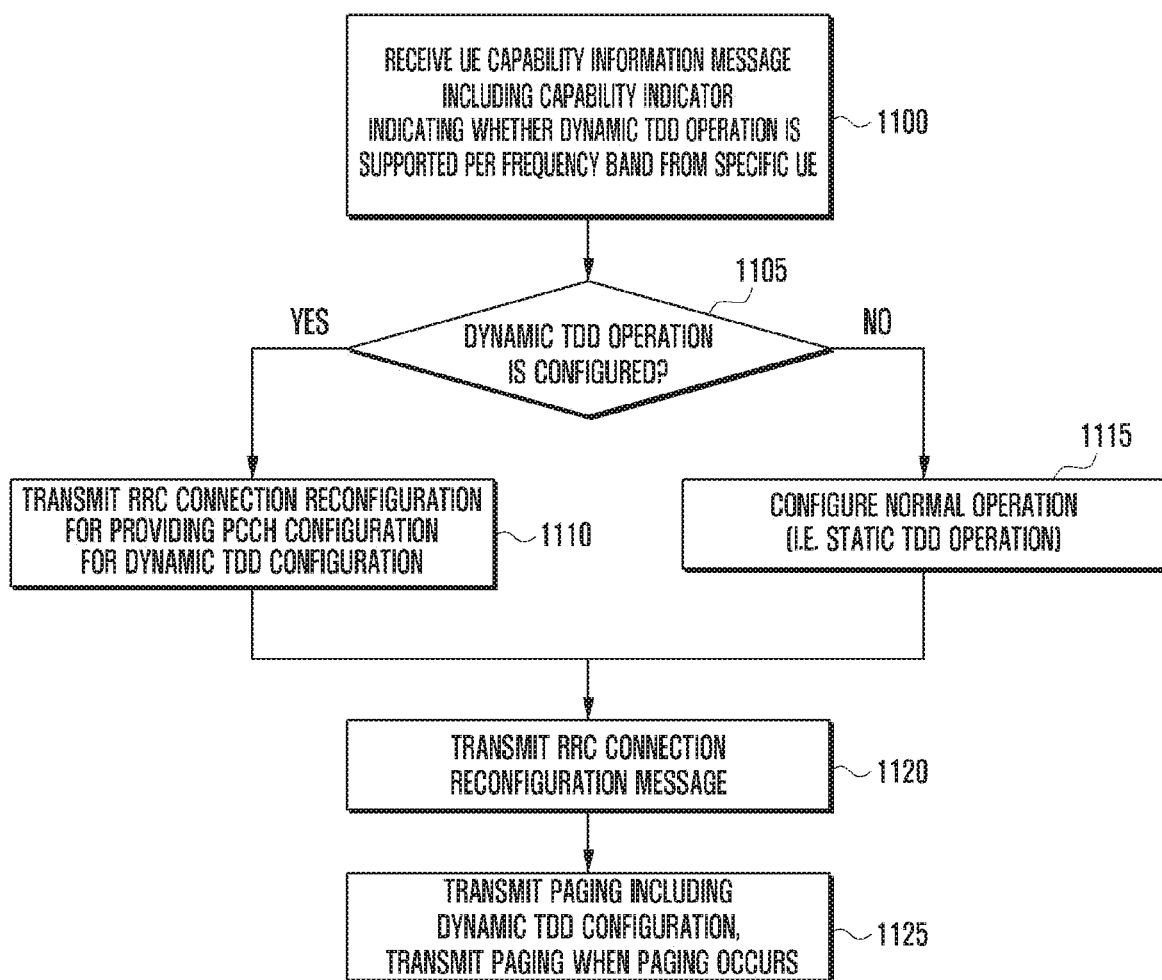
FIG. 11 is a flowchart illustrating the eNB operation in the embodiment 2.

FIG. 11 is a flowchart illustrating the eNB operation in the embodiment 2.

Referring to FIG. 11, the eNB receives the UE capability information message including the capability indicators indicating per-frequency band dynamic TDD operation supportabilities at step 1100.

The eNB determines whether to configure the dynamic TDD operation based on the message at step 1105. If it is determined to configure the dynamic TDD operation, the eNB sends the RRCConnectionReconfiguration message including the PagingCycle-dynamic-TDD and i_s-dynamic-TDD information at step 1110. If it is determined not to configure the dynamic TDD operation, the eNB configures the static TDD operation at step 1115. The eNB sends the UE the RRCConnectionReconfiguration message at step 1120. The eNB transmits the paging message including the last dynamic TDD configuration at step 1125.

Embodiment 3

The UE is allocated transmission resource for PUTSCH transmission in two ways as follows.

1. Receiving uplink grant indicating initial transmission or retransmission through downlink control channel (PD-CCH)

2. Receiving uplink grant containing valid Random Access Response (RAR) in random access procedure When the UE receives the uplink grant at the $n^{th}$ subframe, it performs uplink transmission after a predetermined time, e.g. at the $(n+k)^{th}$ subframe. Here, k relates to the time required for generating MAC PDU and preprocessing at the physical layer for uplink transmission and set to the same value for the UE and eNB.

The embodiment 3 of the present invention proposes a method and apparatus of selecting an uplink subframe for uplink transmission differently depending on whether the uplink grant is received through a downlink control channel or RAR. Particularly in the case that the dynamic TDD operation is configured to the UE, k is determined by applying a second TDD configuration for the case of receiving the uplink grant through PDCCH and by applying a first TDD configuration for the case of receiving the uplink grant through RAR.

Figure 16:
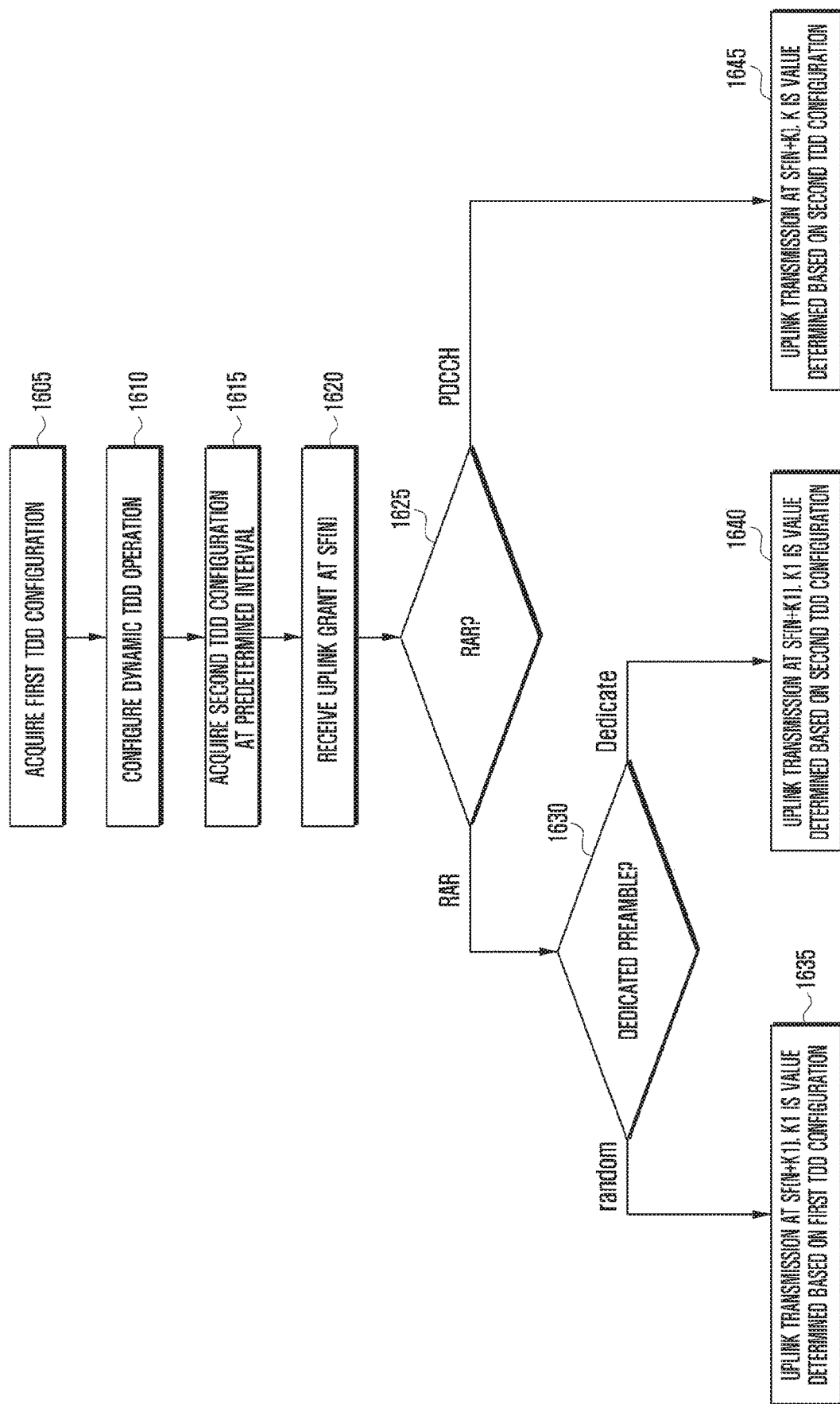
FIG. 16 is a flowchart illustrating a UE operation of determining a subframe for uplink transmission by applying the first and second TDD configurations selectively.

FIG. 16 shows the UE operation of the present invention.

For reference, the TDD configuration information is an integer between 0 and 6 which indicates the configuration of downlink, uplink, and special subframes in a radio frame. In the present invention, two types of TDD configuration informations are used. The first TDD configuration information is the information that can be understood by the terminals including the terminal which does not supporting the dynamic TDD operation and transmitted through the system information which all of the terminal can receive in the corresponding cell. The system information may be the System Information Block 1. The SIM is transmitted repeatedly at a predetermined interval and includes essential information for used in determining whether to camp on the corresponding cell such as network provider information of the corresponding cell as well as the first TDD configuration information. The first TDD configuration information may be contained in a field which all of the UEs including initial release UEs can understand, i.e. legacy field. The second TDD configuration information is understood by only the UEs supporting the dynamic TDD operation and transmitted to the UEs in various ways. The second TDD configuration information is transmitted repeatedly at a predetermined interval and may be changed dynamically. The eNB determines the most suitable TDD configuration at a predetermined timing in consideration of the load condition of the current cell and ratio between downlink and uplink traffics and then sends the UEs configured for the dynamic TDD operations the second TDD configuration information in a predetermined method.

Referring to FIG. 16, the UE acquires the first TDD configuration information at step 1605. As described above, the UE receives predetermined system information and checks the first TDD configuration information contained in the legacy field of the system information. The first TDD configuration information has a property of not changing frequently and, if it is changed, this triggers a system information modification procedure. The dynamic TDD operation is configured to the UE at step 1610. If the dynamic TDD operation is configured, this means that the UE receives the control message including the control information instructing to start the dynamic TDD operation. The dynamic TDD operation is the operation of changing the TDD configuration of the UE dynamically according to the load state of the cell. The dynamic TDD operation is categorized into two types as follows.

Dynamic TDD operation 1: The TDD configuration may be modified at a predetermined interval, and the eNB notifies the UE of the TDD configuration to be applied at the current time or in the near future using a predetermined method, e.g. predetermined control information, periodically. The TDD configuration information is an integer between 0 and 6 like the legacy TDD configuration information and indicates the configuration of the uplink, downlink, and special subframes.

Dynamic TDD operation 2: The 10 subframes forming a radio frame are sorted into fixed subframes and flexible subframes, A fixed subframe is fixed as a downlink subframe, uplink subframe, or special subframe; and a flexible subframe may be used as a downlink subframe or an uplink subframe. For example, the subframes may be defined as shown in table 5.

TABLE 5

| | |
|---|---|
| fixed downlink subframe | subframes #0, #5 |
| fixed uplink subframe | subframes #1, #6 |
| fixed special subframe | subframes #2, #7 |
| flexible subframe | subframes #3, #4, #8, #9 |

An embodiment of the present invention is applicable to both the dynamic TDD operations 1 and 2. However, in view of the detailed operation of the UE, part of the operation is applicable to one of the two dynamic TDD operations.

The UE acquires the second TDD configuration information at step 1615. The second TDD configuration information is sent to the UE through a predetermined control message. The predetermined control message may be the system information, an RRC control message, a MAC control message, or a message transmitted on PDCCH. Step 1615 is applied only to the dynamic TDD operation 1.

The UE receives a valid uplink grant at the $n^{th}$ subframe at step 1620.

The UE determines whether the valid uplink grant is received through the RAR or PDCCH at step 1625. If the valid uplink grant is received through the RAR, the procedure goes to step 1630 and, otherwise if the valid uplink grant is received through the PDCCH, the procedure goes to step 1645. If the valid uplink grant is received through the RAR, this has the meaning as follows.

The RAR is a response message transmitted by the eNB in reply to the preamble transmitted by the UE and includes a header and a payload, the header containing Random Access Preamble ID (RAPID) and the payload containing various informations as well as uplink grant. The UE monitors to receive an RAR during a predetermined period after transmitting the random access preamble and, if the RAR includes the same RAPID as the preamble it has transmitted, determines that the RAR and the uplink grant included in the RAR are valid.

If the valid uplink grant is received through PDCCH, this means that the uplink grant masked with the UE identifier (C-RNTI) is received through the PDCCH.

The UE determines whether the preamble which has triggered the RAR transmission is the dedicated preamble or random preamble at step 1630. The random access procedure includes transmitting, at the UE, a preamble, transmitting, at the eNB, an RAR, and performing, at the UE, uplink transmission according to the uplink grant of the RAR (this is expressed as transmitting a message 3). In the random access procedure, the UE selects the preamble by itself, or the eNB instructs to use a specific preamble. The former case is of being called use of a random preamble, and the latter case is of being called use of a dedicated preamble. In the case of using the random preamble, the eNB does not know which UE is performing the random access procedure until the message 3 is received successfully. In the case of using the dedicated preamble, however, the eNB can identify the UE upon receipt of the preamble. For example, the eNB recognizes whether the UE supports the dynamic TDD upon receipt of the message 3 in the case of using the random preamble and upon receipt of the preamble in the case of using the dedicated preamble. If the UE receives the RAR in response to the random preamble, this means that the eNB has transmitted the uplink grant to the UE in the state of not knowing whether the UE had been configured for the dynamic TDD operation and thus the procedure goes to step 1635. If the UE receives the RAR in response to the dedicated preamble, this means that the eNB has transmitted the uplink grant to the UE in the state of knowing that the UE supports the dynamic TDD operation and thus the procedure goes to step 1640.

The UE determines the subframe for uplink transmission by applying the TDD configuration indicated in the first TDD configuration information at step 1635. If the procedure goes to step 1635, this means that the UE configured for the dynamic TDD transmits the random access preamble and receives the RAR in response thereto. Although the dynamic TDD operation is applied in a certain cell, since there may be the cells which do not support the dynamic TDD operation within the cell, in the case where the eNB cannot identify the UE until a predetermined time after performing an operation such as the random access operation, even though the UE is configured for the dynamic TDD operation, it is preferred to determine the uplink subframe by applying the same rule as the other UEs which are not configured for the dynamic TDD operation other than the uplink subframe determined by the dynamic TDD operation. Accordingly, at step 1635, the UE determines the subframe for uplink transmission by applying the TDD configuration indicated in the first TDD configuration information. This means the operation described in detail as follows. The UE performs uplink transmission at the $(n+k1)^{th}$ subframe for the uplink grant received at the $n^{th}$ subframe. Here, k1 is an integer equal to or greater than 6 corresponding to the first uplink subframe since the $(n+6)^{th}$ subframe. Whether a subframe is an uplink subframe may be determined differently depending on the TDD configuration, and the UE determines which is the first uplink subframe since the $(n+6)^{th}$ subframe by applying the first TDD configuration and performs uplink transmission based on the determination result at step 1635. At this time, although the subframe which is determined as the first uplink subframe since the $(n+6)^{th}$ subframe according to the first TDD configuration information is a downlink subframe or a flexible subframe according to the second TDD configuration information, the UE operates under the assumption that the subframe is the uplink subframe. The RAR uplink grant may include uplink transmission resource information, modulation scheme and coding rate for uplink transmission, size of data to be transmitted, and 1-bit information indicating whether uplink transmission is delayed (hereinafter referred to as uplink transmission delay information). If the uplink transmission delay information is set to 0, the UE performs uplink transmission at the uplink subframe corresponding to k1. If the uplink transmission delay information is set to 1, the UE performs uplink transmission at the first uplink subframe since the uplink subframe corresponding to k1. At this time, the UE determines the first uplink subframe since the subframe corresponding to k1 based on the TDD configuration indicated in the first TDD configuration information. The uplink transmission delay is a kind of load balancing.

The UE determines the subframe for uplink transmission by applying the second TDD configuration at step 1640. if the procedure goes to step 1640, the UE configured for the dynamic TDD operation transmits the dedicated preamble and receives a response message in reply thereto. This means that the eNB transmits the uplink grant in the state of knowing that the UE had been configured for the dynamic TDD and thus the UE applies the second TDD configuration information. In more detail, the LTE performs uplink transmission at the $(n\pm k1)^{th}$ subframe, and k1 is an integer equal to or greater than 6 and corresponds to the first uplink subframe based on the TDD configuration indicated in the second TDD configuration information. If the uplink transmission delay information of the RAR. is set to 0, the UE selects k1 based on the second TDD configuration and performs uplink transmission at the $(n+k1)^{th}$ subframe. If the uplink transmission delay information of the RAR is set to 1, the UE performs uplink transmission at the first uplink subfratne since the subframe corresponding to the k1 selected based on the second TDD configuration. At this time, the UE determines the first uplink subframe since the subframe corresponding to k1 based on the second TDD configuration.

If the procedure goes to step 1645, this means that the eNB which knows that the UE is configured for the dynamic TDD operation transmits the downlink grant to the corresponding UE. The UE determines the subframe for uplink transmission based on the second TDD configuration. The timing relationship between the uplink grant received through PDCCH and the uplink transmission corresponding thereto is defined per TDD configuration in table 8-2 (table 6) of standard 36.213

TABLE 6

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | | 4 | | | | | | | 4 | 4 |
| 4 | | | | | | | | | 4 | 4 |
| 5 | | | | | | | | | 4 | |
| 6 | 7 | 7 | | | | 7 | 7 | | | 5 |

For example, when the UE receives the uplink grant at the $0^{th}$ subframe, k is 4 for the TDD configuration 0 and 7 for the TDD configuration 6.

Figure 17:
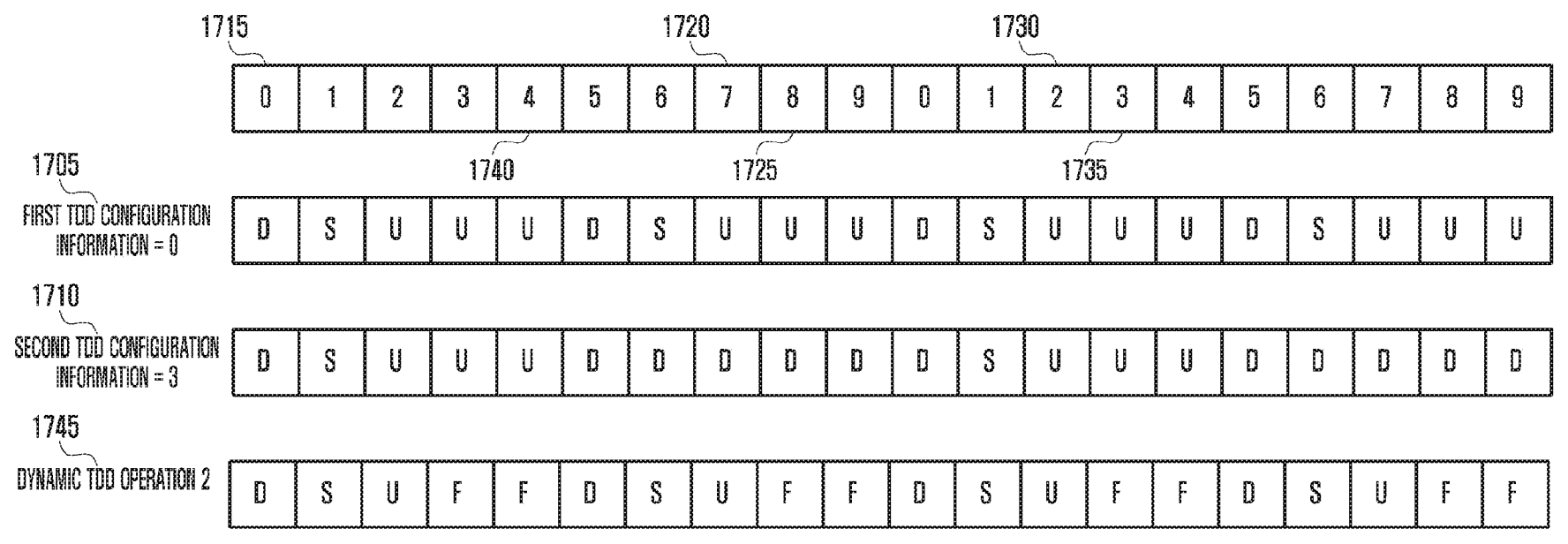

The above operation is described with the example of FIG. 17.

Referring to FIGS. 16 and 17, the first TDD configuration 1705 is the TDD configuration 0, and the second TDD configuration 1710 is the TDD configuration 3. The UE receives the uplink grant at the $0^{th}$ subframe 1715. If the uplink grant is received through the PAR and a random preamble has been transmitted by the UE, the UE determines k1 based on the first TDD configuration. That is, among the subframes after $6^{th}$ subframe, when applying the TDD configuration 0, the first uplink subframe corresponds to k1, i.e. the $7^{th}$ subframe in the above example. If the uplink transmission delay information is set to 0, the LTE performs uplink transmission at the $7^{th}$ subframe 1720. If the uplink transmission delay information is set to 1, the UE determines the subframe corresponding to k1 by applying the first TDD configuration and the first uplink subframe 1725 since then by applying the first TDD configuration. At the subframe, uplink transmission is performed.

If the uplink grant is received through the RAR and the UE has transmitted a dedicated preamble, the UE determines k1 by applying the second TDD configuration. That is, among the subframes after at least the $6^{th}$ subframe, when applying the TDD configuration 3, the first uplink subframe is k1, i.e. the $12^{th}$ subframe in the above example. If the uplink transmission delay is set to 0, the UE performs uplink transmission at the $2^{nd}$ subframe 1730. If the uplink transmission delay is set to 1, the UE determines the subframe indicated by k1 and then checks the first uplink subframe 1735 since then based on the second TDD configuration. Then the uplink transmission is performed at that subframe.

If the uplink grant is received through PDCCH, the UE determines k by applying the second TDD configuration.

Referring to table 8-2, the TDD configuration 3 is applied and the uplink grant is received at the $0^{th}$ subframe, k is 4. Accordingly, the UE performs uplink transmission at the $4^{th}$ subframe 1740.

The above embodiment is directed to an example of using the dynamic TDD operation 1. A description is made of the difference in the case of using the dynamic TDD operation 2 hereinafter.

Steps 1605 and 1610 are identically applied to the case of using the dynamic TDD operation 2.

In the case of applying the dynamic TDD operation 2, step 1615 is not needed.

Steps 1620 to 1635 are also identically applied to the case of using the dynamic TDD operation 2.

At step 1640, the UE performs uplink transmission at the first subframe among the uplink subframes and flexible subframes since the $6^{th}$ subframe after the subframe in which the uplink grant is received. That is, k1 is an integer which is greater than 6 and corresponds to the subframe appearing first between the first uplink subframe and the first flexible subframe. In the example of FIG. 17, the UE performs uplink transmission at the $7^{th}$ subframe 1720 (if the uplink transmission delay information is set to 0) or the $8^{th}$ subframe 1725 (if the uplink transmission delay information is set to 1).

At step 1645, the UE performs uplink transmission at the first subframe among the uplink subframes and flexible subframes since the $4^{th}$ subframe after the subframe in which the uplink grant is received. That is, k is an integer which is greater than 4 and corresponds to the subframe appearing first between the first uplink subframe and the first flexible subframe In the example of FIG. 17, the UE performs uplink transmission at the $4^{th}$ subframe 1740.

The UE determines the operation to perform at the $n^{th}$ subframe before the $n^{th}$ subframe begins. Examples of the operation include monitoring PDCCH at the corresponding subframe, transmitting uplink feedback, receiving downlink feedback, and transmitting PUSCH, The UE monitors the PDCCH at the downlink subframes to determine whether there is any scheduling or data present for it. If the UE is configured for the dynamic TDD operation, it determines the operation to perform by applying the first and second. TDD configurations selectively. The UE which is not configured for the dynamic TDD operation always determines the operation to perform by applying the first TDD configuration.

Figure 18:
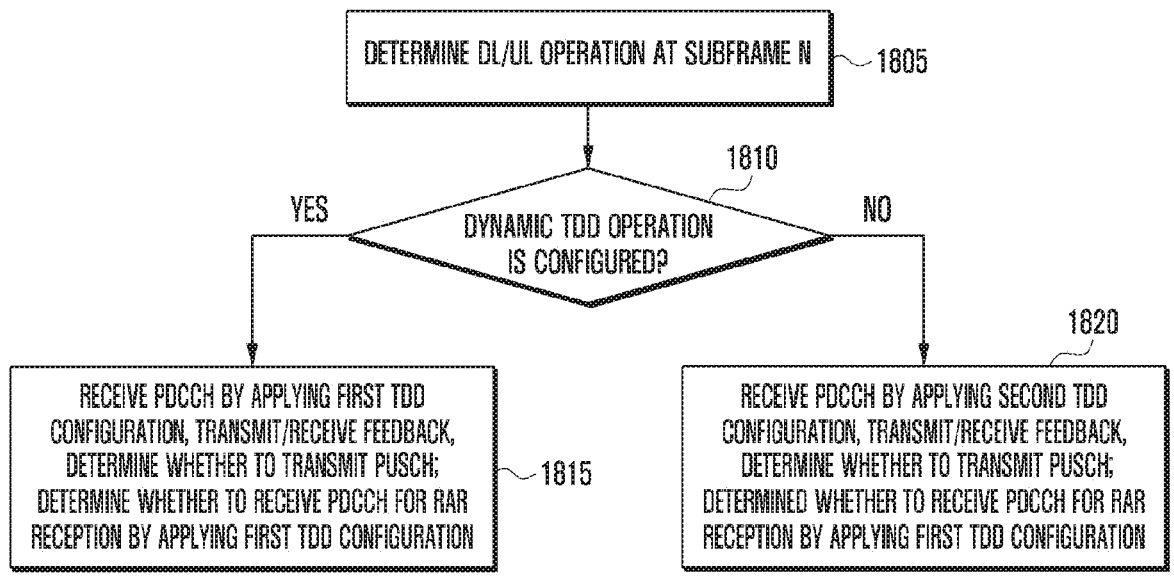
FIG. 18 is a flowchart illustrating a UE operation of determining the operation to perform at the $n^{th}$ subframe by applying the first and second TDD configurations selectively.

FIG. 18 is a flowchart illustrating a UE operation of determining the operation to perform at the $n^{th}$ subframe by applying the first and second TDD configurations selectively.

Referring to FIG. 18, the UE starts a procedure of determining whether to perform the downlink subframe-related operation or uplink subframe-related operation in a certain subframe at step 1805.

The UE determines whether the dynamic TDD operation is configured at step 1810. If the dynamic TDD operation is not configured, the procedure goes to step 1820 and, otherwise, step 1815.

The UE operates as follows at step 1815.

The UE determines whether a scheduling message masked with a C-RNTI is received through PDCCH in the corresponding subframe by applying the first TDD configuration. If the corresponding subframe is a downlink subframe or a special subframe when the first TDD configuration is applied, the UE monitors the PDCCH in the subframe to receive the scheduling message masked with the C-RNTI.

The UE determines whether to receive HARQ feedback at the corresponding subframe by applying the first TDD configuration. The timing relationship between the PUSCH transmission and HARQ feedback is specified per TDD configuration in standard 36.213. If the corresponding subframe is a downlink subframe in the first TDD configuration, the UE determines whether the PUSCH has been transmitted at a previous uplink subframe to receive the HARQ feedback in the subframe.

The UE determines whether to transmit PUSCH at the corresponding subframe by applying the first TDD configuration. If the corresponding subframe is an uplink subframe and the uplink grant is received through PDCCH before k subframes, the UE transmits PUSCH at the corresponding subframe. Here, k is determined based on the first TDD configuration.

The UE determines whether to transmit an uplink HARQ feedback at the corresponding subframe by applying the first TDD configuration. If the corresponding subframe is an uplink subframe and PUSCH is received before a predetermined period specified per TDD configuration based on the first TDD configuration, the UE transmits the uplink HARQ feedback.

The UE determines whether an RAR masked with an RA-RNTI is received through PDCCH at the corresponding subframe by applying the first TDD configuration. If the UE has transmitted a preamble at the $x^{th}$ subframe and if the corresponding subframe is a subframe between the $(x+m)^{th}$ and $(x+m+k)^{th}$ subframes and if the corresponding subframe is a downlink subframe or a special subframe based on the first TDD configuration, the UE monitors the PDCCH in the corresponding subframe for receiving the RAR masked with the RA-RNTI. Here, in and k are parameters for the random access response window specifying the duration for attempting to receive the RAR after transmitting the preamble m is a fixed value, and k is a parameter the length of which is notified by the system information. If no valid RAR is received before the expiry of the RAR window, the UE enters the preamble retransmission procedure.

The UE determines whether to receive PUSCH in response to the RAR uplink grant at the corresponding subframe by applying the first TDD configuration. If the corresponding subframe is an uplink subframe and the uplink grant is received through the RAR before k1 subframes, the UE transmits PUSCH at the corresponding subframe. Here, k1 is determined based on the first TDD configuration.

At step 1820, the UE operates as follows. In summary, the UE applies the first TDD configuration for transmitting a message 3 and receiving an RAR and the second TDD configuration for other purposes.

The UE determines whether to monitor the PDCCH to receive the scheduling message masked with a C-RNTI at the corresponding subframe by applying the second TDD configuration. If the corresponding subframe is an uplink subframe or a special subframe in the case of applying the second TDD configuration, the UE monitors PDCCH to receive the scheduling message masked with a C-RNTI in the subframe.

The UE determines whether to receive HARQ feedback at the corresponding subframe by applying the second TDD configuration. The timing relationship between the PUSCH transmission and the HAR.Q feedback reception is specified per TDD configuration in the standard 36.213. If the corresponding subframe is a downlink subframe based on the second TDD configuration, the UE determines whether to receive the HARQ feedback in the corresponding subframe based on the second TDD configuration.

The UE determines whether to transmit PUSCH at the corresponding subframe by applying the second TDD configuration. If the corresponding subframe is an uplink subframe and if an uplink grant is received through PDCCH before k subframes, the UE transmits PUSCH at the corresponding subframe. Here, k is determined based on the second TDD configuration.

The UE determines whether to transmit an uplink HARQ feedback at the corresponding subframe by applying the second TDD configuration. If the corresponding subframe is an uplink subframe and if PDSCH is received before a time period determined per TDD configuration, the UE transmits the uplink feedback.

The UE determines whether to monitor PDCCH to receive the RAR masked with a RA-INTI at the corresponding subframe by applying the first TDD configuration. If the UE has transmitted a preamble at the $x^{th}$ subframe and if the corresponding subframe is a subframe between the $(x+n+m)^{th}$ and $(x+m+k)^{th}$ subframes and if the corresponding subframe is a downlink subframe or a special subframe based on the first TDD configuration, the UE monitors PDCCH to receive the RAR masked with the RA-RNTI in the corresponding subframe. Here, m and k are parameters for the random access response window specifying the duration for attempting to receive the RAR after transmitting the preamble. m is a fixed value, and k is a parameter the length of which is notified by the system information. If no valid RAR is received before the expiry of the RAR window, the UE enters the preamble retransmission procedure.

The UE determines whether to transmit PUSCH in response to an RAR uplink grant in the corresponding subframe by applying the first TDD configuration. If the corresponding subframe is an uplink subframe and if the uplink grant is received through the RAR before k1 subframes, the UE transmits PUSCH at the corresponding subframe. Here, k1 is determined based on the first TDD configuration.

Another UE operation is described hereinafter.

The random access procedure includes transmitting a preamble at the terminal, transmitting a random access response at the eNB, and transmitting uplink data at the UE. At this time, the UE transmits uplink data and receives an HARQ feedback corresponding thereto. If the UE is configured for the dynamic TDD operation, the UE determines the timing of receiving the HARQ feedback by applying the first and second TDD configurations selectively.

Figure 19:
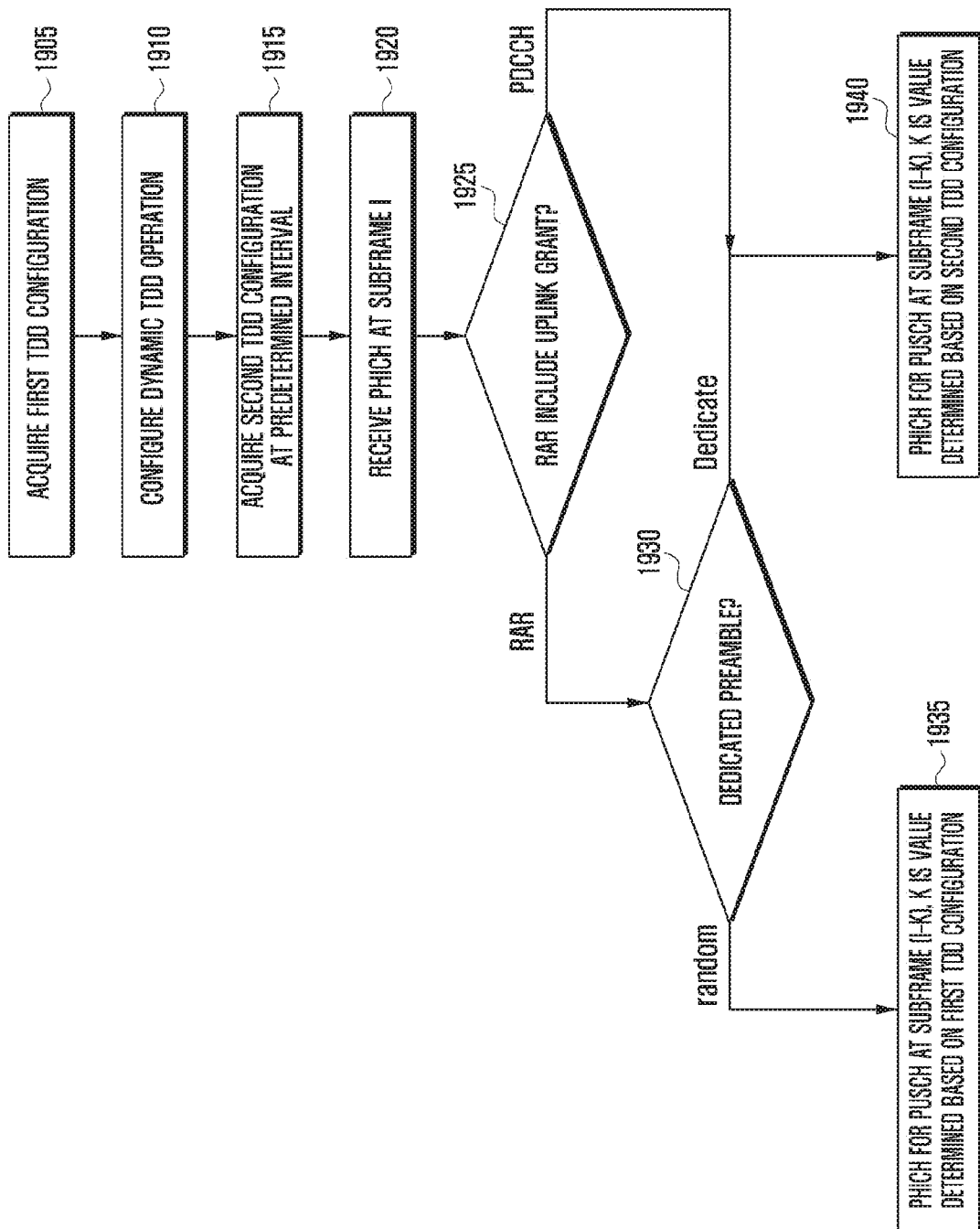
FIG. 19 is a flowchart illustrating a UE operation of determining a subframe for receiving PHICH by applying the first and second TDD configurations selectively.

FIG. 19 shows a related UE operation.

Referring to FIG. 19, the UE acquires the first TDD configuration information at step 1905. As described above, the UE receives predetermined system information and checks the first TDD configuration information contained in the legacy field of the system information. The first TDD configuration information has a property of not changing frequently and, if it changes, a system information modification procedure is applied. The dynamic TDD operation is configured to the UE at step 1910. If the dynamic TDD operation is configured, this means that the UE receives a control message including the control information indicating that the dynamic TDD operation starts. The dynamic TDD operation means the operation of modifying the TDD configuration of the UE dynamically in adaptation to the load state of the UE.

The UE acquires the second TDD configuration information at step 1915. The second TDD configuration information is transmitted to the UE through a predetermined control message. The predetermined control message may be the system information, an RRC control message, a MAC control message, or a message transmitted on PDCCH. Step 1915 is applied only to the dynamic TDD operation 1.

The UE receives a downlink HARQ feedback at a subframe i at step 1920. The downlink HARQ feedback is transmitted/received through a Physical HARQ Indicator Channel (PHICH) and thus, if the downlink HARQ feedback is received, this has the same meaning as receiving the PHICH. In order for the UE to determine the uplink subframe in which the PUSCH corresponding to the HARQ ACK/NACK has been transmitted, the procedure goes to step 1925.

The UE determines whether the uplink grant triggered the PUSCH transmission corresponding to the received PHICH has been transmitted through RAR or PDCCH at step 1925. If the uplink grant has been transmitted through RAR, the procedure goes to step 1930 and, otherwise, step 1940. At step 1930, the UE determines whether the preamble triggered the RAR transmission (or the preamble corresponding to RAPID contained in the RAR) is a dedicated preamble or a random preamble. If the UE receives the RAR in response to the random preamble, this means that the eNB has transmitted the uplink grant to the UE in the state of not knowing whether the UE had been configured for the dynamic TDD operation and thus the procedure goes to step 1935. If the RAR is received in response to the dedicated preamble, this means that the eNB has transmitted the uplink grant to the UE in the state of knowing that the UE had been configured for the dynamic TDD operation and thus the procedure goes to step 1940.

The UE determines the uplink subframe in which the PUSCH corresponding to the PHICH has been transmitted by applying the TDD configuration indicated in the first TDD configuration information at step 1935. For example, the PHICH corresponds to the PUSCH transmitted at the $(i+k)^{th}$ subframe, and k is determined based on the TDD configuration indicated in the first TDD configuration information. The relationship between TDD and k is specified in table 8.3-4 of the standard 36.213 as shown in table 7. For example, if the UE receives the PHICH at the $0^{th}$ subframe and if the TDD configuration 0 is applied at the corresponding timing, k is 7 and the PHICH is the HARQ feedback corresponding to the PUSCH transmitted at the $(i+7)^{th}$ subframe.

Table 7 shows table 8.3-1 of the standard 36.213. The table shows the value k in the respective TDD configurations 0 to 6.

TABLE 7

| TDD UL/DL configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | | 6 | | | | | 6 | |
| 3 | 6 | | | | | | | | 6 | 6 |
| 4 | | | | | | | | | 6 | 6 |
| 5 | | | | | | | | | 6 | |
| 6 | 6 | 4 | | | | 7 | 4 | | | 6 |

The UE determines whether the uplink subframe in which the PUSCH corresponding to the PHICH has been transmitted by applying the TDD configuration indicated in the second TDD configuration information at step 1940. For example, the PHICH corresponds to the PUSCH transmitted at the $(i+k)^{th}$ subframe, and k is determined based on the TDD configuration indicated in the second TDD configuration information. The relationship between the TDD configuration and k is specified in table 8.3-1 of the standard 36.213.

Figure 20:
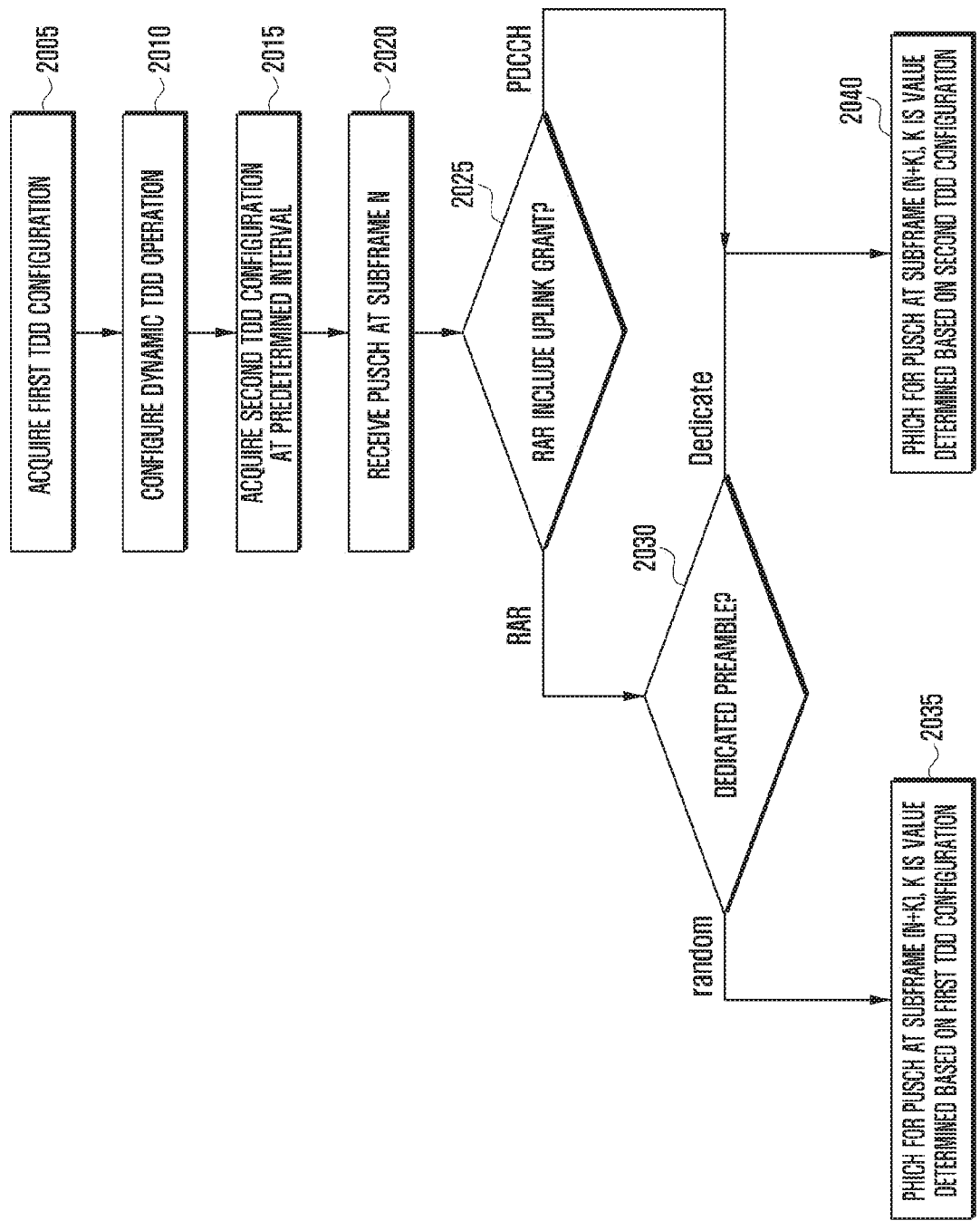
FIG. 20 is a flowchart illustrating another UE operation of determining a subframe for receiving by applying the first and second TDD configurations selectively.

FIG. 20 shows another operation of the UE in association of the above operation.

Referring to FIGS. 19 and 20, the operations depicted in FIGS. 20 and 19 are led to the same result and thus provide the same effect.

Steps 2005 to 2015 are identical with steps 1905 to 1915.

The UE performs PUSCH transmission at the $n^{th}$ subframe at step 2005. The UE determines the subframe for receiving feedback corresponding to the PUSCH at step 2025.

At step 2025, the UE determines whether the uplink grant triggering the PUSCH transmission has been transmitted through RAR or PDCCH. If it has been received through RAR, the procedure goes to step 2030 and, otherwise if it has been received through PDCCH, step 2040.

At step 2030, the UE determines whether the preamble corresponding to the RAR is a dedicated preamble or a random preamble. If the RAR is received in response to a random preamble, this means that the eNB has transmitted the uplink grant to the UE in the state of not knowing whether the UE had been configured for the dynamic TDD operation and thus the procedure goes to step 2035. If the RAR is received in response to a dedicated preamble, this means that the eNB has transmitted the uplink grant to the UE in the state of knowing that the UE had been configured for the dynamic TDD operation and thus the procedure goes to step 2040.

At step 2035, the UE determines the subframe for receiving PHICH by applying the first TDD configuration. For example, the UE receives PHICH at the $(n+k)^{th}$ subframe. Here, k is determined according to the TDD configuration indicated in the first TDD configuration information. The relationship between TDD configuration and k may be determined by referencing table 8.3-1 of the standard 36.213. For example, if the UE has transmitted the PUSCH at the $2^{nd}$ subframe and the TDD configuration is the TDD configuration 1, the PHICH is received at the $6^{th}$ subframe.

At step 2040, the UE determines the subframe for receiving PHICH by applying the second TDD configuration. For example, the UE receives the PHICH at the $(n+k)^{th}$ subframe.

Figure 21:
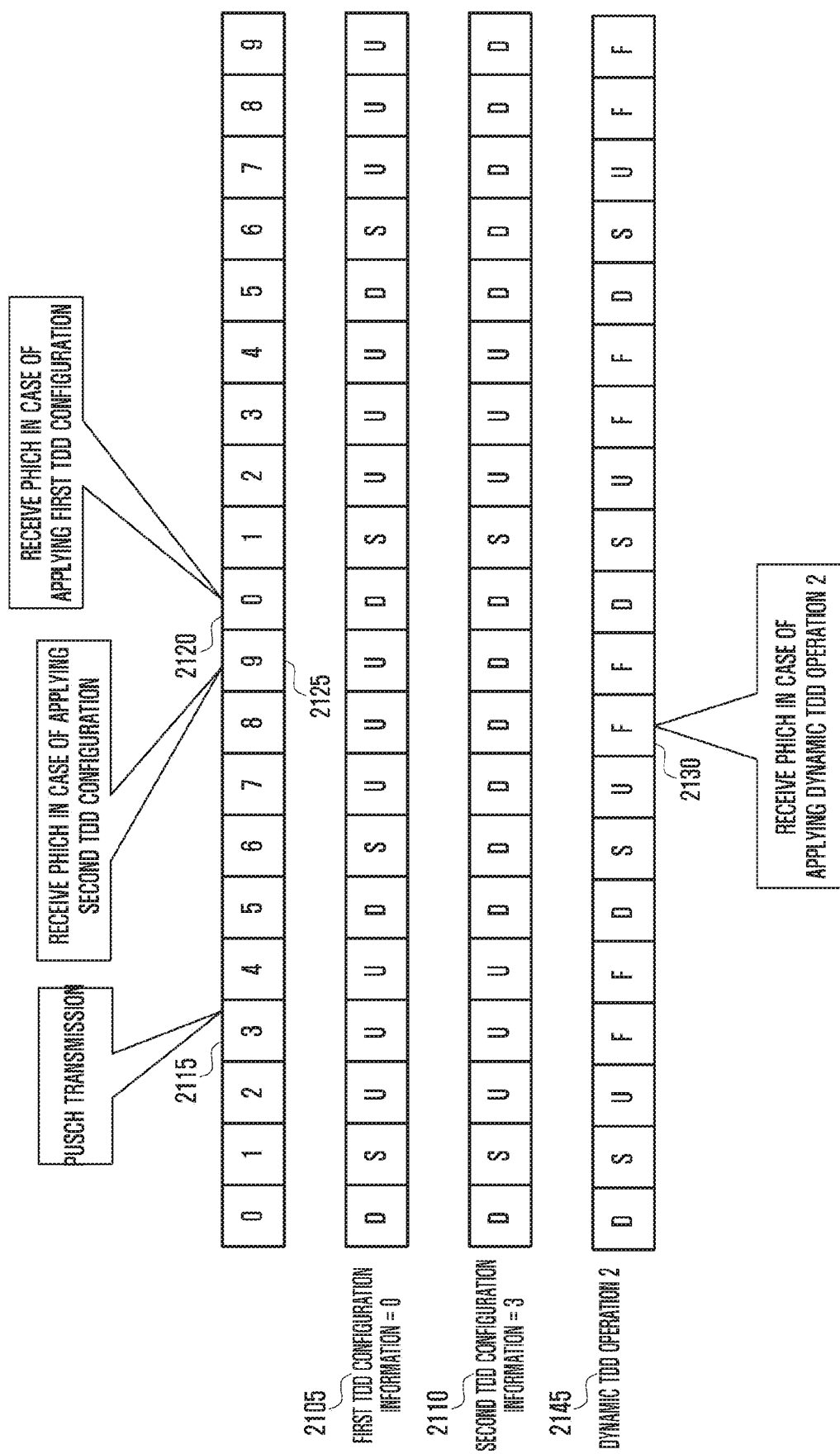
FIG. 21 is a diagram exemplifying the operation of determining a subframe for receiving PHICH by applying the first and second TDD configurations selectively.

A description is made of an example of the above operation with reference to FIG. 21.

In FIG. 21, the first TDD configuration is the configuration 0 as denoted by reference number 2105 and the second TDD configuration is the configuration 3 as denoted by reference number 2110. The UE transmits PUSCH at the $3^{rd}$ subframe as denoted by reference number 2115. If the uplink grant associated with the PUSCH transmission has been received through RAR and if the UE had transmitted a random preamble, the UE determines k by applying the first TDD configuration. Referring to FIG. table 8.3-1, since k of the $0^{th}$ subframe is 7 in the TDD configuration 3 and the distance between the $0^{th}$ subframe and the $3^{rd}$ subframe is 7 so as to match each other in the TDD configuration 0 when the PUSCH has been transmitted at the $3^{rd}$ subframe, the UE sets k to 7 and receives the PHICH at the $0^{th}$ subframe 2120. If the uplink grant has been received through RAR and if the UE has used the dedicated preamble or if the uplink grant has been received through PDCCH, the UE determines k based on the second TDD configuration. Referring to table 8.3-1, since the PUSCH has been transmitted at the $3^{rd}$ subframe and k of the $9^{th}$ subframe is 6 and the distance between the $9^{th}$ subframe and the $3^{rd}$ subframe is 6 so as to match each other, the UE sets k to 6 and receives PHICH at the $9^{th}$ subframe 2125.

The above embodiment is directed to the case of using the dynamic TDD operation 1. The difference of the UE operation in the case of using the dynamic TDD operation 2 is described hereinafter.

The UE operation in the case of applying the dynamic TDD operation 1 at steps 2005, 2010, and 2020 to 2035 is identical with the UE operation in the case of applying the dynamic TDD operation 2, In the case of using the dynamic TDD operation 2, step 2015 is not required.

At step 2040, the UE determines the subframe for eceiving PHICH according to the following conditions.

[Conditions]

Fixed downlink subframe after at least four subframes since the subframe in which PUSCH has been transmitted, subframe appearing first among fixed special subframes and flexible subframes.

In the embodiment of FIG. 21, UE which has transmitted PUSCH at the third subframe receives PHICH at the $8^{th}$ subframe 2130 fulfilling the above condition.

It may occur that the UE configured for the dynamic TDD operation does not recognize the second TDD configuration temporarily. For example, this may be the cases in that the UE is operating in the discontinuous reception period of the subframe carrying the second TDD configuration information and the UE suspends receiving downlink signal at a subframe for measurement on other frequencies.

Figure 22:
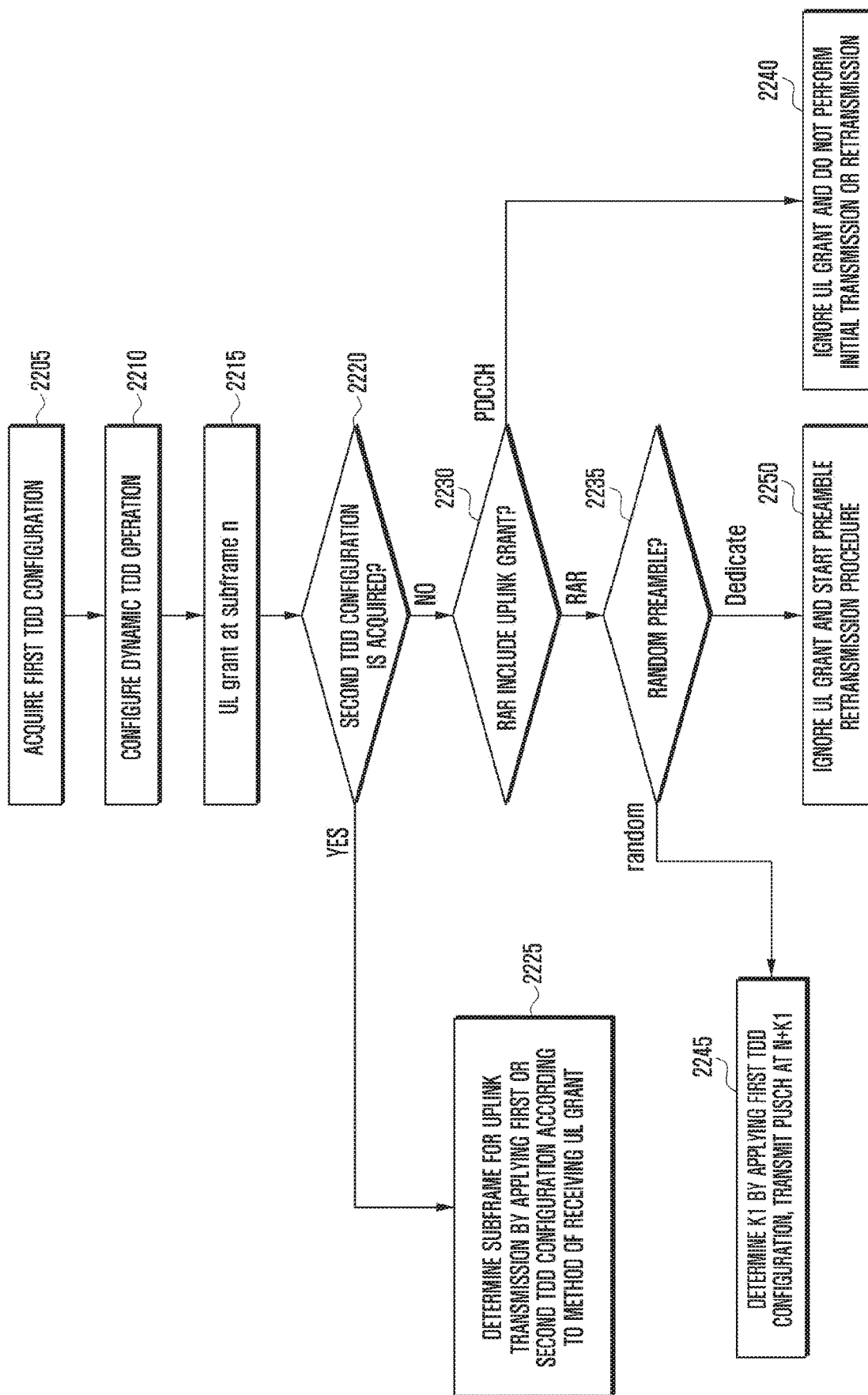
FIG. 22 is a flowchart illustrating a UE operation of selecting a subframe for uplink transmission at the UE which has not acquired the second TDD configuration temporarily.

FIG. 22 is a flowchart illustrating an operation taken when the UE which has not recognized the second TDD configuration temporarily receives an uplink grant.

Referring to FIG. 22, steps 2205 and 2210 are identical with steps 1605 and 1610.

The UE receives an uplink grant at step 2215. For convenience, it is assumed that the subframe at which the PUSCH is transmitted is the $n^{th}$ subframe.

The UE determines whether the second TDD configuration information to be applied to the corresponding timing is received at step 2220. As described above, the second TDD configuration information is transmitted at a predetermined interval. For example, the second TDD configuration information to be applied to the $m^{th}$ time duration is transmitted in a predetermined subframe of the $(m-1)^{th}$ time duration and, when the uplink grant is received at a certain subframe of the $m^{th}$ time duration, the UE determines whether the corresponding subframe has the second TDD configuration information to be applied to the $m^{th}$ time duration. If so, the procedure goes to step 2225. If not, the goes to step 2230.

At step 2225, the UE determines the subframe for PUSCH transmission by applying the first or second TDD configuration considering whether the uplink grant has been received through RAR or PDCCH.

At step 2230, the UE determines whether the uplink grant has been received through RAR or PDCCH. If the uplink grant has been received through PDCCH, the procedure goes to step 2240 and, otherwise if the uplink grant has been received through RAR, step 2235.

If the procedure goes to step 2240, this means that the UE does not determine k although it is supposed to determine k by applying the second TDD configuration. Accordingly, the UE does not perform any initial transmission even when the uplink grant indicates initial transmission and does not perform any retransmission even when the uplink grant indicates retransmission. Nevertheless, CURRENT_N-B_TX of recording the number of transmissions or CUR- RENT_IRV related to Redundancy Version for use in the next transmission increases normally.

At step 2235, the UE determines whether the preamble triggered the received RAR is a dedicated preamble or a random preamble. If it is a random preamble, the procedure goes to step 2245 and, otherwise if it is a dedicated preamble, step 2250.

If the procedure goes to step 2245, this means that the uplink transmission corresponding to the RAR uplink grant in the random access procedure initiated with the random preamble. The UE determines k1 by applying the first TDD configuration, even though it does not know the second TDD configuration, and has to transmit PUSCH using the uplink transmission resource allocated in the $(n+k1)^{th}$ subframe (if the uplink delay is set to 0) or the first uplink subframe after the $(n+k1)^{th}$ subframe (if the uplink delay is set to 1).

If the procedure goes to step 2250, this means that the UE has to perform the uplink transmission corresponding to the RAR uplink grant in the random access procedure initiated with the dedicated preamble. Although the UE has to determine k1 by applying the second TDD configuration, since it does not know the second TDD configuration to be applied to the corresponding time duration, the UE cannot determine k1. The UE ignores the uplink grant, i.e. skips PUSCH transmission using the uplink transmission resource allocated by means of the uplink grant, and starts the preamble retransmission procedure. That is, the UE retransmits the preamble in the uplink subframe fulfilling a predetermined condition. The predetermined condition is fulfilled by the uplink subframe having the preamble transmission resource which appears after at least 4 subframes when the first TDD configuration is applied.

FIG. 23 shows an operation of receiving PHICH at the UE which has not recognized the second TDD configuration temporarily.

Steps 2305 and 2310 of FIG. 23 are identical with steps 1605 and 1610.

The UE performs PUSCH transmission at step 2315. For convenience, it is assumed that the subframe at which the PUSCH is transmitted is the $n^{th}$ subframe.

The UE determines whether the second TDD configuration information to be at the corresponding timing is acquired at step 2320. As described above, the second TDD configuration information is transmitted at a predetermined interval. For example, the second TDD configuration information to be applied at the $m^{th}$ time duration is transmitted in a predetermined subframe of the $(m-1)^{th}$ time duration and, when the uplink grant is received at a certain subframe of the $m^{th}$ time duration, the UE determines whether the subframe has the second TDD configuration information to be applied to the $m^{th}$ time duration. If so, the procedure goes to step 2325. If not, the procedure goes to step 2330.

At step 2325, the UE determines the subframe for receiving PHICH by applying the first or second TDD configuration considering whether the uplink grant triggered the PUSCH transmission has been received through RAR or PDCCH.

At step 2330, the UE determines whether the uplink grant triggered the PUSCH transmission has been received through RAR or PDCCH. If the uplink grant has been received through PDCCH, the procedure goes to step 2340 and, otherwise if the uplink grant has been received through RAR, the procedure goes to step 2335.

If the procedure goes to step 2340, this means that although it is supposed to determine the subframe for receiving PHICH by applying the second TDD configuration the UE cannot determine the subframe because it does not know the second TDD configuration. Accordingly, the UE stops attempting PHICH reception. Then the UE sets HARQ_FEEDBACK to ACK such that non-adaptive retransmission corresponding to the PUSCH does not occur. Or the UE flushes the buffer of the HARQ process associated with the PUSCH transmission. The HARQ_FEEDBACK is a parameter for managing the last HARQ feedback information per HARQ process and it is set to NACK for performing non-adaptive retransmission and ACK for suspending transmission until a separate retransmission command is received. Although the HARQ_FEEDBACK has to be set according to the actually received HARQ feedback, it is set to ACK even though the HARQ feedback is not received if PHICH is not received due to no information about the second TDD configuration.

At step 2335, the UE determines whether the preamble triggered the RAR reception is a dedicated preamble or a random preamble. If it is a random preamble, the procedure goes to step 2345 and, otherwise if it is a dedicated preamble, step 2340.

Figure 12:
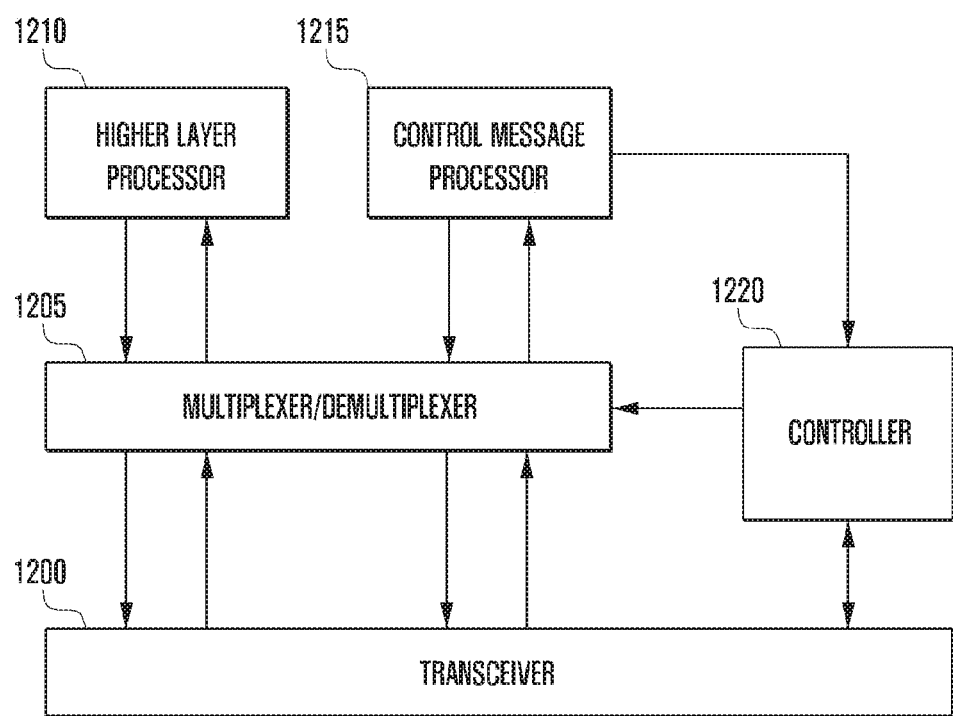
FIG. 12 is a block diagram illustrating a configuration of the UE to which the present invention is applied.

If the procedure goes to step 2345, this means that the uplink grant has been received through RAR in the random access procedure initiated with the random preamble and thus the PUSCH has been transmitted. Accordingly, the UE determines k by applying the first TDD configuration, although it does not know the second TDD configuration, and receives PHICH at the $(n+k)^{th}$ subframe. FIG. 12 is a block diagram illustrating a configuration of the UE to which the present invention is applied.

The UE includes a transceiver 1200, a multiplexer/demultiplexer 1205, upper layer processors 1210 and 1215, and a controller 1220. In the case of transmitting control signals and/or data to the eNB, the UE multiplexes the controls signals and/or data by means of the multiplexer/demultiplexer 1205 and transmits the multiplexed signal by means of the transceiver 1200 under the control of the controller 1220. In the case of receiving signals, the UE receives a physical signal by means of the transceiver 1200, demultiplexes the received signal by means of the multiplexer/demultiplexer 1205, and delivers the demultiplexed information to the higher layer processor 1210 and/or control message processor 1215, under the control of the controller 1220.

Figure 13:
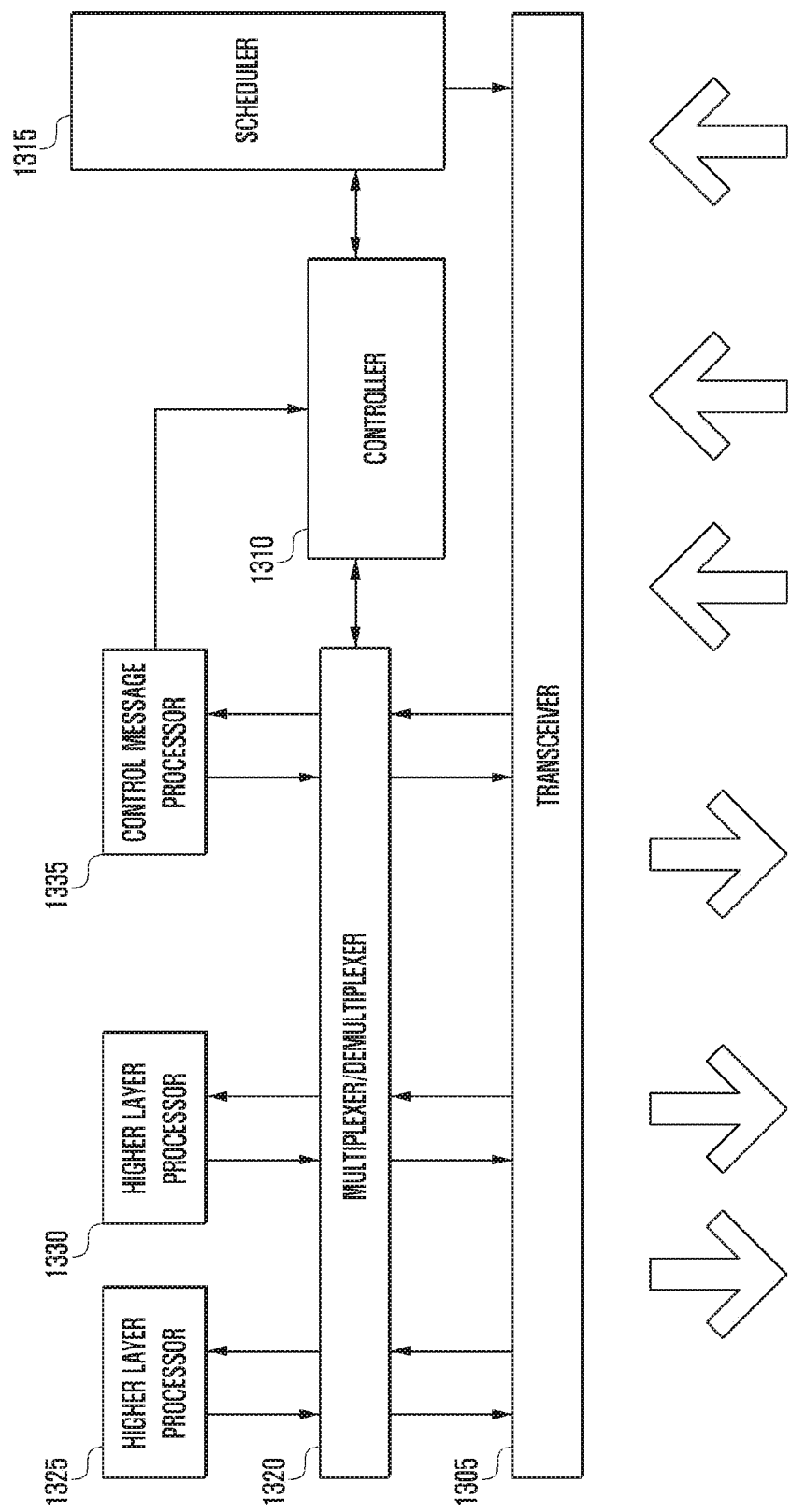
FIG. 13 is a block diagram illustrating a configuration of an eNB according to the present invention.

FIG. 13 is a block diagram illustrating a configuration of an eNB according to the present invention.

Referring to FIG. 13, the eNB includes a transceiver 1305, a controller 1310, a multiplexer/demultiplexer 1320, a control message processor 1335, various higher layer processors 1325 and 1330, and a scheduler 1315.

The transceiver 1305 transmits data and predetermined control signals through a downlink carrier and receives data and predetermined control signals through an uplink carrier. In the case that a plurality of carriers are configured, the transceiver 1305 transmits/receives data and control signals through the plural carriers.

The multiplexer/demultiplexer 1320 is responsible for multiplexing data generated by the higher layer processors 1325 and 1330 and the control message processor 1335 or demultiplexing the data received by the transceiver 1305 to deliver the demultiplexed data to the higher layer processors 1325 and 1330, control message processor 1335, or controller 1310. The controller 1310 determines whether to apply a band-specific measurement gap to a specific UE and whether to include the configuration information in the RRCConnectionReconfiguration message.

The control message processor 1335 generates the RRC-ConnectionReconfiguration to the lower layer according to the instruction of the controller.

The higher layer processors 1325 and 1330 may be established per UE or per service to process the data generated in association with the user service such as File Transfer Protocol (FTP) and Voice over Internet Protocol (VoIP) and transfer the processed data to the multiplexer/demultiplexer 1320 or process the data from the multiplexer/demultiplexer 1320 and transfer the processed data to the upper layer service applications.

The scheduler 1315 allocates transmission resource to the UE at an appropriate timing based on the buffer status, channel status, and Active Time of the UE and controls the transceiver 1305 to process the signals received from and to be transmitted to the It is to be appreciated that those skilled in the art can change or modify the embodiments without departing from the technical concept of this invention. Accordingly, it should be understood that above-described embodiments are essentially for illustrative purpose only but not in any way for restriction thereto. Thus the scope of the invention should be determined by the appended claims and their legal equivalents rather than the specification, and various alterations and modifications within the definition and scope of the claims are included in the claims.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

The invention claimed is:

1. A method by a terminal in a communication system, the method comprising:
    receiving, from a base station, a system information block message including information on a first time division duplex (TDD) uplink/downlink (UL/DL) configuration;
    receiving, from the base station, a physical downlink control channel (PDCCH) including downlink control information, the downlink control information including information related to a second TDD UL/DL configuration;
    receiving, from the base station, uplink scheduling information for the terminal; and
    transmitting, to the base station, data in a subframe based on the uplink scheduling information, wherein the data is not transmitted in a subframe which is changed from an uplink subframe determined based on the information on the first TDD UL/DL configuration to a downlink subframe determined based on the information related to the second TDD UL/DL configuration.

2. The method of claim 1, wherein the transmitting the data further comprises:
    transmitting, based on the uplink scheduling information being received in a random access response message, the data in the subframe determined based on the information of the first TDD UL/DL configuration.

3. The method of claim 1, wherein the transmitting the data further comprises:
    transmitting based on the uplink scheduling information being received in the PDCCH, the data in the subframe determined based on the information related to the second TDD UL/DL configuration.

4. The method of claim 1, wherein the transmitting the data comprises:
    transmitting, based on the uplink scheduling information being received in a random access response message in a subframe n, data corresponding to the uplink scheduling information based on the information on the first TDD UL/DL configuration in a subframe n+k,
    wherein in the k is an integer greater than or equal to 6.

5. A terminal in a communication system, the terminal comprising:
    a transceiver; and
    a controller configured to:
    control the transceiver to receive, from a base station, a system information block message including information on a first time division duplex(TDD) uplink/downlink(UL/DL) configuration, receive, from the base station, a physical downlink control channel(PDCCH) including downlink control information, the downlink control information including information related to a second TDD UL/DL configuration, receive, from the base station, uplink scheduling information for the terminal and transmit, to the base station, data in a subframe based on the uplink scheduling information,
    wherein the data is not transmitted in a subframe which is changed from an uplink subframe determined based on the information on the first TDD UL/DL configuration to a downlink subframe determined based on the information related to the second TDD UL/DL configuration.

6. The terminal of claim 5, wherein the controller is further configured to:
    control the transceiver to transmit based on the uplink scheduling information being received in a random access response message, the data in the subframe determined based on the information of the first TDD UL/DL configuration.

7. The terminal of claim 5, wherein the controller is further configured to:
    control the transceiver to transmit based on the uplink scheduling information being received in the PDCCH, the data in the subframe determined based on the information related to the second TDD UL/DL configuration.

8. The terminal of claim 5, wherein the controller is further configured to:
    control the transceiver to transmit, based on the uplink scheduling information being received in a random access response message in a subframe n, data corresponding to the uplink scheduling information based on the information on the first TDD UL/DL configuration in a subframe n+k,
    wherein k is an integer greater than or equal to 6.

9. A method by a base station in a communication system, the method comprising:
    transmitting, to a terminal, a system information block message including information on a first time division duplex(TDD) uplink/downlink(UL/DL) configuration;
    transmitting, to the terminal, a physical downlink control channel(PDCCH) including downlink control information, the downlink control information including information related to a second TDD UL/DL configuration;
    transmitting, to the terminal, uplink scheduling information for the terminal; and
    receiving, from the terminal, data in a subframe based on the uplink scheduling information, wherein the data is not received in a subframe which is changed from an uplink subframe determined based on the information on the first TDD UL/DL configuration to a downlink subframe determined based on the information related to the second TDD UL/DL configuration.

10. The method of claim 9, wherein the receiving the data further comprises:

receiving, based on the uplink scheduling information being transmitted in a random access response message, the data in the subframe determined based on the information on the first TDD UL/DL configuration.

11. The method of claim 9, wherein the receiving the data further comprises:

receiving based on the uplink scheduling information being transmitted in the PDCCH, the data in the subframe determined based on the information related to the second TDD UL/DL configuration.

12. The method of claim 9, wherein the receiving the data comprises:

receiving, based on the uplink scheduling information being transmitted in a random access response message in a subframe n, data corresponding to the uplink scheduling information based on the information on the first TDD UL/DL configuration in a subframe n+k, wherein in the k is an integer greater than or equal to 6.

13. A base station in a communication system, the base station comprising:

a transceiver; and a controller configured to:

control the transceiver to transmit, to a terminal, a system information block message including information on a first time division duplex(TDD) uplink/downlink(UL/DL) configuration, transmit, to the terminal, a physical downlink control channel (PDCCH) including downlink control information, the downlink control information including information related to a second TDD UL/DL configuration, transmit, to the terminal, uplink scheduling information for the terminal and receive, from the terminal, data in a subframe based on the uplink scheduling information, wherein the data is not received in a subframe which is changed from an uplink subframe determined based on the information on the first TDD UL/DL configuration to a downlink subframe determined based on the information related to the second TDD UL/DL configuration.

14. The base station of claim 13, wherein the controller is further configured to control the transceiver to receive based on the uplink scheduling information being transmitted in a random access response message, the data in the subframe determined based on the information on the first TDD UL/DL configuration.

15. The base station of claim 13, wherein the controller is further configured to control the transceiver to receive based on the uplink scheduling information being transmitted in the PDCCH, the data in the subframe determined based on the information related to the second TDD UL/DL configuration.

16. The base station of claim 13, wherein the controller is further configured to control the transceiver to receive based on the uplink scheduling information being transmitted in a random access response message in a subframe n, data corresponding to the uplink scheduling information based on the information on the first TDD UL/DL configuration in a subframe n+k, wherein in the k is an integer greater than or equal to 6.

* * * * *